(12) United States Patent
Afman

(10) Patent No.: US 11,181,916 B2
(45) Date of Patent: Nov. 23, 2021

(54) WATERCRAFT AND WATERCRAFT CONTROL SYSTEM

(71) Applicant: YAMAHA HATSUDOKI KABUSHIKI KAISHA, Shizuoka (JP)

(72) Inventor: Juan Pablo Afman, Kennesaw, GA (US)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 16/825,748

(22) Filed: Mar. 20, 2020

(65) Prior Publication Data

US 2021/0294329 A1    Sep. 23, 2021

(51) Int. Cl.
    *G05D 1/02* (2020.01)
    *G08G 3/00* (2006.01)

(52) U.S. Cl.
    CPC ............ *G05D 1/0206* (2013.01); *G08G 3/00* (2013.01)

(58) Field of Classification Search
    CPC ...... G05D 1/0206; G05D 1/0027; G08G 3/00; G08G 3/02
    See application file for complete search history.

(56) References Cited

U.S. PATENT DOCUMENTS

| | | | |
|---|---|---|---|
| 10,274,959 B2 | 4/2019 | Estabrook | |
| 2009/0076671 A1* | 3/2009 | Mizutani | B63H 25/04 701/21 |
| 2010/0145558 A1* | 6/2010 | Kaji | B63B 79/40 701/21 |
| 2015/0102956 A1* | 4/2015 | Miles | G01S 13/06 342/73 |
| 2016/0018228 A1 | 1/2016 | Parker et al. | |
| 2018/0004209 A1 | 1/2018 | Akuzawa et al. | |
| 2019/0033857 A1 | 1/2019 | Lin | |

(Continued)

FOREIGN PATENT DOCUMENTS

| | | |
|---|---|---|
| JP | H09295600 A | 11/1997 |
| JP | H10147160 A | 6/1998 |

(Continued)

OTHER PUBLICATIONS

The extended search report of the corresponding European Patent Application No. 21162823.5, dated Sep. 9, 2021.

*Primary Examiner* — Aaron L Troost
(74) *Attorney, Agent, or Firm* — Global IP Counselors, LLP

(57) ABSTRACT

A watercraft control system is configured to track and follow a lead watercraft cruising ahead of a host watercraft. The watercraft control system basically includes a detector and a digital controller. The watercraft control system can be integrated with a main watercraft control system of the host watercraft, or can be an add-on watercraft control system that supplements the main watercraft control system of the host watercraft. The detector is configured to detect the lead watercraft in front of the host watercraft. The digital controller is configured to communicate with the detector's processor to receive a detection signal from the detector. The digital controller is configured to output at least one control command related to a propulsion direction of the host watercraft and a propulsion force of the host watercraft to at least a propulsion unit of the host watercraft to track and follow the lead watercraft.

16 Claims, 12 Drawing Sheets

(56) References Cited

U.S. PATENT DOCUMENTS

| | | |
|---|---|---|
| 2019/0039708 A1 | 2/2019 | Hayes et al. |
| 2019/0361116 A1 | 11/2019 | Lee |
| 2019/0361457 A1 | 11/2019 | Johnson et al. |
| 2020/0333781 A1* | 10/2020 | Clarke ................. G05D 1/0027 |

FOREIGN PATENT DOCUMENTS

| | | |
|---|---|---|
| JP | 2002090171 A | 3/2002 |
| JP | 2010238132 A | 10/2010 |
| JP | 2018001945 A | 1/2018 |
| WO | 2016065055 A1 | 4/2016 |
| WO | 2017138920 A1 | 8/2017 |
| WO | 2018123948 A1 | 7/2018 |

* cited by examiner

WATERCRAFT AND WATERCRAFT CONTROL SYSTEM

BACKGROUND

Technical Field

The present disclosure generally relates to the field of watercrafts. More particularly, the present disclosure relates to a host watercraft that is configured to track and follow a lead watercraft.

Background Information

Some watercrafts are equipped with a cruise control system. Typically, for the basic cruise control system, a driver manually attains a desired speed and then initiates the cruise control system to maintain the watercraft at the cruising speed set by the driver. The watercraft then travels at the selected speed relieving the driver regulating the throttle, while the watercraft steers automatically by following a path manually predefined by the user. This path is defined by what is commonly known as waypoints in the marine industry.

SUMMARY

Generally, the present disclosure is directed to any watercraft such as an outboard motor boat, a personal watercraft, a jet boat, a pontoon boat, etc., or a watercraft control system that is configured to track and follow a lead watercraft cruising ahead of the host watercraft. Thus, such a watercraft is equipped with object sensing technology and an autopilot capable of full throttle control, shifting control and steering control.

In accordance with one aspect of the present disclosure, a watercraft is provided that is configured to track and follow a lead watercraft cruising ahead of the host watercraft. The host watercraft basically comprises a watercraft body, a propulsion unit, a detector and a digital controller. The propulsion unit is provided to the watercraft body. The detector is configured to detect the lead watercraft. The digital controller is configured to communicate with the detector to receive a detection signal from the detector. The digital controller is configured to output at least one control command related to a propulsion direction of the watercraft and a propulsion force of the watercraft to at least the propulsion unit to track and follow the lead watercraft.

In accordance with another aspect of the present disclosure, a watercraft control system is provided that is configured to track and follow a lead watercraft cruising ahead of a host watercraft. The watercraft control system basically comprises a detector and a digital controller. The detector is configured to detect the lead watercraft in front of the host watercraft. The digital controller is configured to communicate with the detector to receive a detection signal from the detector. The digital controller is configured to output at least one control command related to a propulsion direction of the host watercraft and a propulsion force of the host watercraft to at least a propulsion unit of the host watercraft to track and follow the lead watercraft.

Also, other features, aspects and advantages of the disclosed watercraft and the disclosed watercraft control system will become apparent to those skilled in the watercraft field from the following detailed description, which, taken in conjunction with the annexed drawings, discloses several illustrative embodiments of a watercraft and a watercraft control system with various features.

BRIEF DESCRIPTION OF THE DRAWINGS

Referring now to the attached drawings which form a part of this original disclosure, watercrafts are illustrated having a watercraft control system for tracking and following a lead watercraft.

Figures 1, 2:
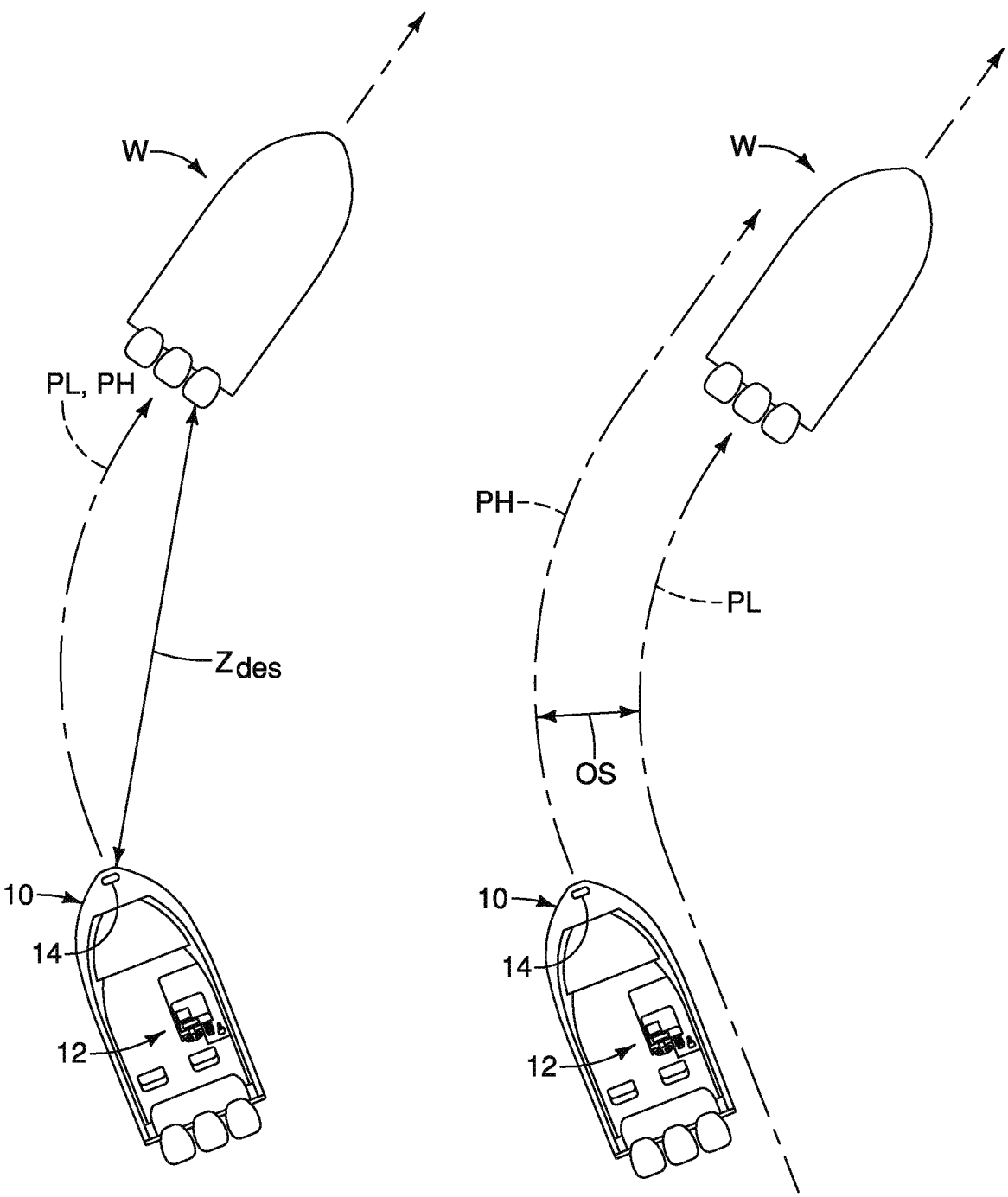
FIG. 1 is a schematic top view of a host watercraft equipped with a watercraft control system in which the host watercraft path is tracking and following in a path of a lead watercraft cruising ahead of the host watercraft in accordance with the present disclosure.
FIG. 2 is a schematic top view of the host watercraft tracking and following the lead watercraft in which the host watercraft path is offset from the path of the lead watercraft.

It should be noted that these figures are intended to illustrate the general characteristics of methods, structures and/or materials utilized in certain illustrative embodiments and to supplement the written description provided below. These drawings are not, however, to scale and may not precisely reflect the precise structural or performance characteristics of any given embodiment, and should not be interpreted as defining or limiting the range of values or properties encompassed by illustrative embodiments. The use of similar or identical reference numbers in the various drawings is intended to indicate the presence of a similar or identical element or feature.

DETAILED DESCRIPTION OF EMBODIMENTS

Selected embodiments will now be explained with reference to the drawings. It will be apparent to those skilled in the watercraft field from this disclosure that the following descriptions of the embodiments are provided for illustration only and not for the purpose of limiting the invention as defined by the appended claims and their equivalents. Like reference numerals in the drawings denote like similar or identical elements or features, and thus the descriptions of the similar or identical elements or features may be omitted in later embodiments.

Referring initially to FIGS. 1 and 2, a watercraft 10 is illustrated in accordance with a first embodiment. The watercraft 10 is configured to track and follow a lead watercraft W that is cruising ahead of the watercraft 10. More specifically, the watercraft 10 includes a watercraft control system 12 that is configured to automatically track and follow the lead watercraft W that is cruising ahead of the watercraft 10 once the lead watercraft W is selected by the driver or user for tracking and following. The watercraft control system 12 can be integrated with a main watercraft control system of the watercraft 10, or can be an add-on watercraft control system that supplements the main watercraft control system of the watercraft 10. In either case, the watercraft 10 is equipped with the watercraft control system 12 such that the watercraft 10 constitutes a host watercraft with respect to the lead watercraft W.

Here, in the first embodiment, the watercraft control system 12 of the watercraft 10 includes a detector 14 that is configured to detect the lead watercraft W in front of the watercraft 10. Preferably, the detector 14 includes an image recognition device as shown in the first embodiment. However, the detector 14 can include optical sensors such as one or more cameras, and/or one or more camera active sensors such as lasers, lidar, or millimeter-wave radars. In the first embodiment, the detector 14 is a stereo camera which is basically two cameras in a single unit that is mounted to the watercraft 10.

The watercraft 10 is configured to be driven in either an autopilot mode or a manual mode. Here, the watercraft 10 is provided with a drive-by-wire system that operates the watercraft 10, and that is configured to perform various operations of the watercraft 10. Specifically, the watercraft 10 is provided with a cockpit that has a steering wheel or helm 16 (e.g., a manual steering device) and a remote control 18 (e.g., a manual throttle-shift device). The steering wheel 16 is used by a driver or user to manually turn the watercraft 10, and thus, manually change a propulsion direction of the watercraft 10. The remote control 18 is used by a driver or user to manually control a propulsion force of the watercraft 10. In the autopilot mode, the driver set a cruising speed for the watercraft 10 and a travel path defined by waypoints in a conventional manner. It will be apparent from disclosure that the autopilot mode is an optional feature that is not necessary for the track and follow mode described herein.

As seen in FIG. 1, the watercraft control system 12 can be set by a user to move along a host watercraft path PH that tracks and follows in a lead watercraft path PL of the lead watercraft W. On the other hand, a user can set the watercraft control system 12 to move along the host watercraft path PH that tracks and follows the lead watercraft path PL of the lead watercraft W with a predetermined lateral offset amount OS with respect to the lead watercraft path PL of the lead watercraft W as seen in FIG. 2. Preferably, the predetermined lateral offset amount OS is adjustable by the user. The predetermined lateral offset amount OS can be adjusted by the user to one of a plurality of preset distances or can be infinitely adjusted by the user to any desired distances within the tracking capabilities of the watercraft control system 12.

Also, as seen in FIG. 1, the watercraft 10 tracks and follows the lead watercraft W by a target following distance $Z_{des}$. This target following distance $Z_{des}$ can be adjusted by the user to one of a plurality of preset target following distances or can be infinitely adjusted by the user to any desired target following distance within the tracking capabilities of the watercraft control system 12 (e.g., the detector 14). The target following distance $Z_{des}$ can be set by the user in both cases of the watercraft 10 following in the lead watercraft path PL of the lead watercraft W and the watercraft 10 being offset from the lead watercraft path PL of the lead watercraft W. Instead of the watercraft control system 12 using a target following distance for maintaining the target following distance $Z_{des}$, the watercraft control system 12 can be configured to track and follow the lead watercraft W within a predetermined target following range. In other words, the watercraft control system 12 can be configured so that a following distance of the watercraft 10 from the watercraft control system 12 can vary within a target following range while the watercraft 10 tracks and follows the lead watercraft W to maintain the target following distance $Z_{des}$. Stated differently, the watercraft control system 12 can be configured to maintain the target following distance $Z_{des}$ by either maintaining a target following distance or a target following range. Thus, as used herein, the term "target following distance" does not require a single following distance to be maintained.

As explained later in more detail, upon the watercraft control system 12 detecting the lead watercraft in the host watercraft path PH, the watercraft control system 12 notifies the host watercraft driver of the watercraft 10 of the lead watercraft W and provides the host watercraft driver with an option to activate an auto-track & follow mode. If the auto-track & follow mode is activated, then the watercraft control system 12 engages an automatic steering control such that the watercraft 10 tracks the lead watercraft W and also engages an automatic throttle control such that the watercraft 10 maintains the target following distance $Z_{des}$ behind the lead watercraft W while also tracking the lead watercraft W. After the auto-track & follow mode is activated, the host watercraft driver does not need to input any control commands (i.e., hands free driving) unless the watercraft control system 12 experiences a failure or the host watercraft driver wants to deactivate the watercraft control system 12 from the auto-track & follow mode. The watercraft control system 12 can also be set with a maximum following speed such that the watercraft 10 does not exceed the maximum following speed in the event that the lead watercraft W is traveling above the maximum following speed. Thus, the watercraft 10 will continue to track the lead watercraft W but the distance between the watercraft 10 and the lead watercraft W will be allowed to increase above the target following distance $Z_{des}$. At some point, the lead watercraft W may be at a distance from the watercraft 10 such that the watercraft control system 12 can no longer track the lead watercraft W. In this case, the watercraft control system 12 will automatically deactivate from the auto-track & follow mode and will alert driver that the auto-track & follow mode has been deactivate. If the watercraft 10 was previously traveling in a cruise control mode at a preset speed or an autopilot mode, then the normal cruise control or the normal autopilot mode will resume. Otherwise, the watercraft 10 will return to the manual mode.

Figure 3:
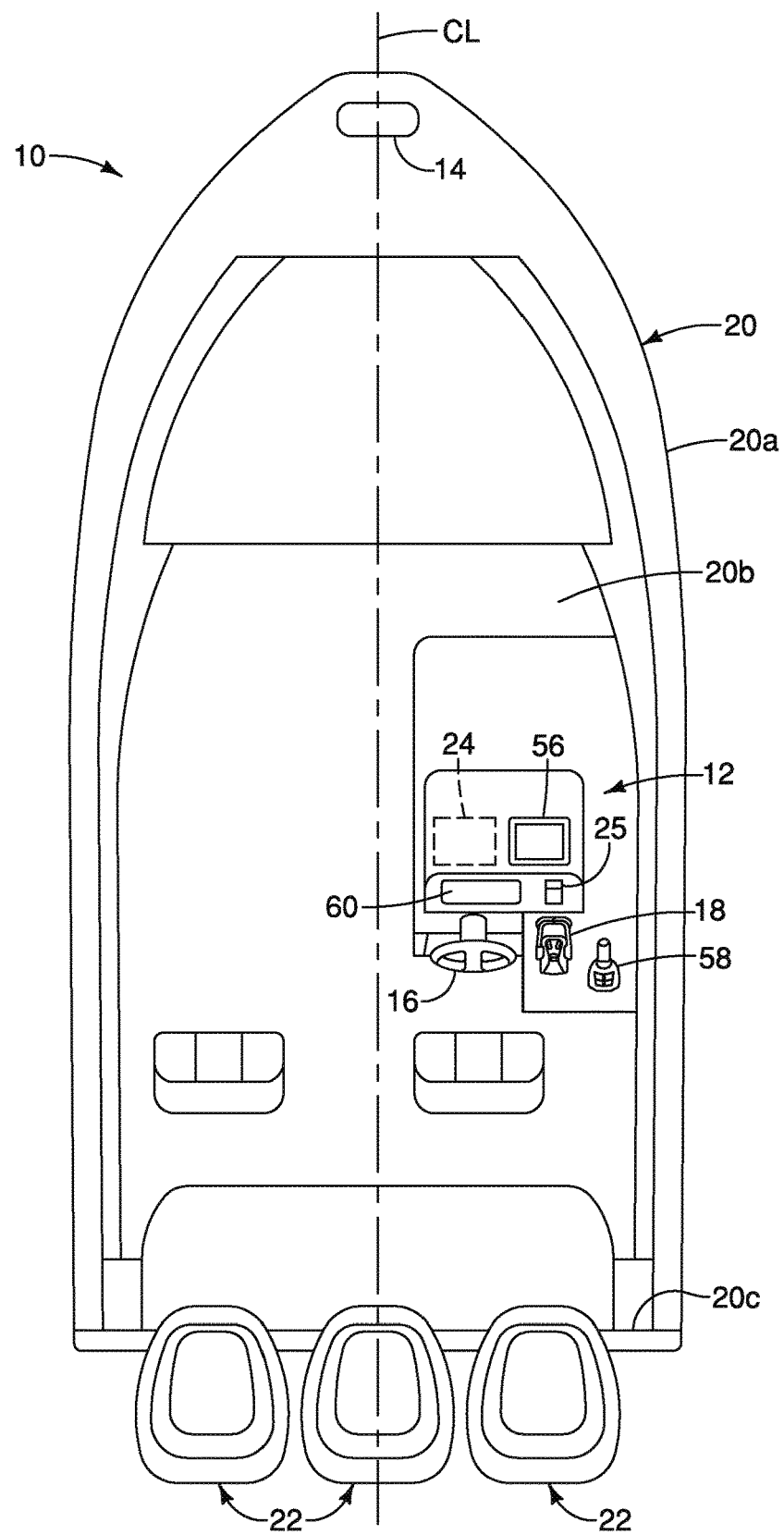
FIG. 3 is a simplified top view of the host watercraft including the watercraft control system in accordance with the present disclosure.

Referring to FIG. 3, a simplified top view of the watercraft 10 is illustrated, and some of the parts of the watercraft 10 will now be discussed. In the first embodiment, the watercraft 10 basically includes a watercraft body 20 and a plurality of propulsion units 22. The detector 14 is preferably mounted to the watercraft body 20 near the front end of the watercraft 10. Preferably, the detector 14 is disposed on a centerline CL of the watercraft body 20. However, the location of the detector 14 is not limited to the illustrated location.

Here, the watercraft 10 is illustrated as an outboard motor boat that is equipped with the watercraft control system 12. However, the watercraft control system 12 is not limited to being used with an outboard motor boat. Rather, as explained later, the watercraft control system 12 can be applied to practically any watercraft that includes a propulsion system and a steering system.

Here, the watercraft body 20 basically includes a hull 20a and a deck 20b. The deck 20b is provided on the hull 20a in a conventional manner. Preferably, the hull 20a and the deck 20b are integrated to form a unit. The hull 20a, the deck 20b and the other parts of the watercraft 10 are made of suitable materials that are typically used in watercrafts for a marine environment, and thus, the materials of the various parts of the watercraft 10 will not be discussed herein. However, the watercraft body 20 is not limited to the illustrated hull and deck construction. Rather, the construction of the watercraft body depends on the type of watercraft. For example, a watercraft body of a pontoon boat typically includes two or more pontoons that support a deck. Also, for example, the watercraft body may not have a deck.

Figure 4:
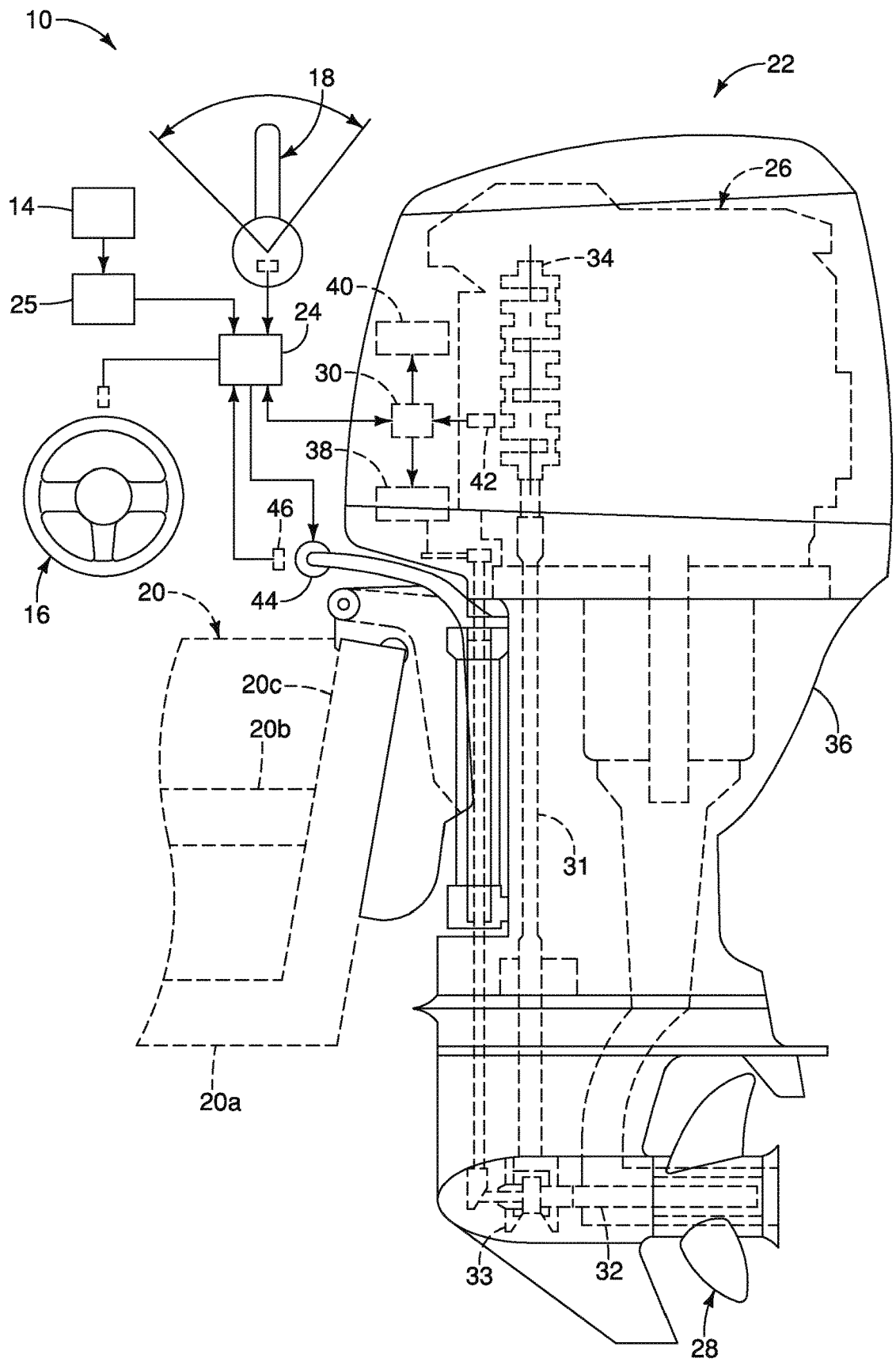
FIG. 4 is a simplified partial side view of a rear portion of the host watercraft showing one of the propulsion units with various controls schematically illustrated.

The propulsion unit 22 is provided to propel the watercraft 10 in a conventional manner. In the first embodiment, three of the propulsion units 22 are provided in the form of three outboard motors as seen in FIG. 3 (only one of the propulsion units 22 is shown in FIG. 4). However, the propulsion units 22 are not limited to this illustrated configuration of the first embodiment. It is acceptable for the propulsion units to be inboard motors or water jet propulsion devices instead of outboard motors. Basically, the term "propulsion unit" as used herein is a machine that produces a thrust to push a watercraft. The propulsion unit can also be referred to as a propulsion device or a propulsion system. A propulsion unit or device typically includes a drive source (e.g. an engine or an electric motor) and a propulsor (e.g. a propeller or an impeller) that provide a thrust to the watercraft.

While the watercraft 10 is illustrated as having three of the propulsion units 22, it will be apparent from this disclosure that the watercraft 10 can have only a single propulsion unit, two propulsion units, or more than three propulsion units, as needed and/or desired, depending on the particular design of the watercraft. Also, the watercraft 10 can be provided with one or more other types of propulsion units such as one or more water-jet drives and/or inboard motors. In other words, the auto-track & follow mode of the watercraft control system 12 can be used with other types of propulsion systems other than the propulsion system illustrated in the first embodiment. In any case, the watercraft 10 comprises at least one propulsion unit that is provided to the watercraft body 20, and more preferably further comprises an additional propulsion unit 22 that is provided to the watercraft body 20.

The propulsion units 22 are controlled by the driver using the steering wheel 16 to manually turn the watercraft 10, and using the remote control 18 to manually control a propulsion force (thrust) of the watercraft 10. The remote control 18 is also used by the driver or user reverse the direction of the thrusts of the propulsion units 22. Preferably, the propulsion units 22 can be independently turned with respect to each other. Also, the thrust of the propulsion units 22 can be independently controlled by the driver or user. Here, the steering system of the watercraft 10 is a steer-by-wire system in which the steering wheel 16 is not mechanically connected to the propulsion units 22. However, the watercraft control system 12 can be adapted to a mechanical steering system. Likewise, the remote control 18 is not mechanically connected to the propulsion units 22. However, the watercraft control system 12 can be adapted to a watercraft having a mechanical throttle system. Since the steering systems and throttle systems are not well known and the auto-track & follow mode of the watercraft control system 12 can be adapted to those known systems, the steering system and throttle system of the watercraft 10 of the first embodiment will only be briefly discussed herein.

Figure 5:
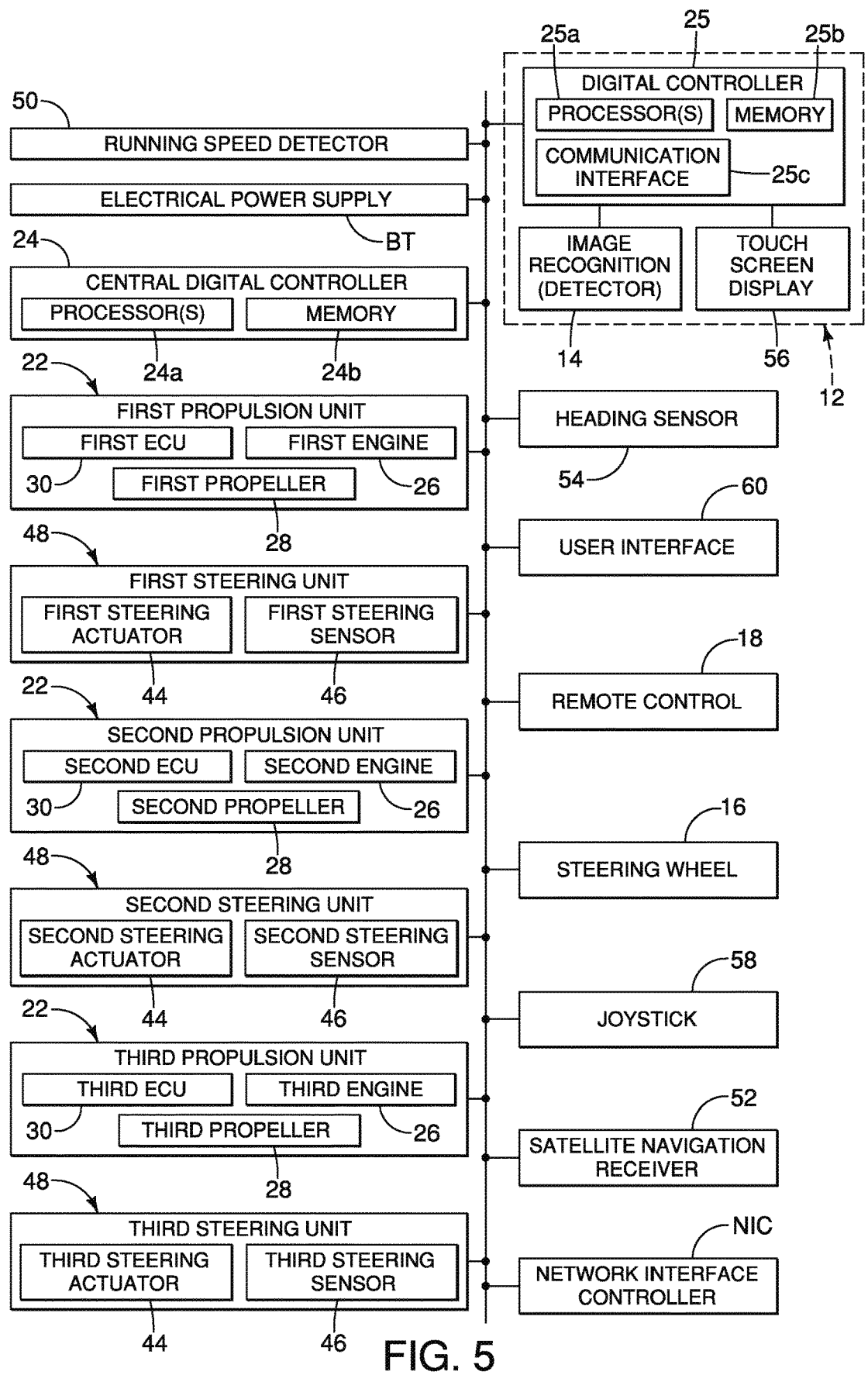
FIG. 5 is a block diagram of selected components of the host watercraft equipped with the watercraft control system having a digital controller (graphics processing unit or GPU) that communicates with a central digital controller (boat control unit or BCU) of the watercraft.

As seen in FIG. 5, a block diagram of selected components of the watercraft 10. As schematically illustrated in FIG. 5, the watercraft 10 is provided with a central digital controller 24 that is connected to a network of the watercraft 10, and the watercraft control system 12 includes a digital controller 25 that is connected to the network of the watercraft 10. For example, the network of the watercraft 10 can be Controller Area Network (CAN bus) that allow microcontrollers and devices to communicate with each other. The central digital controller 24 can be also referred to as a boat control unit (BCU), while the digital controller 25 can be also referred to as a graphics processing unit (GPU). In FIG. 5, the watercraft control system 12 is illustrated as an add-on component of the watercraft 10. However, some or all of the functions of the digital controller 25 (GPU) could be integrated into the central digital controller 24 (BCU). Thus, the term "digital controller" is not limited to a single controller having one or more processors, but rather includes one controller as well as two or more controllers that are physically separated from each other. Thus, for example, the term "digital controller" can include a GPU by itself, the BCU by itself or both the GPU and the BCU.

Also as seen in FIG. 5, the watercraft 10 is provided with an electrical power supply BT (e.g., a battery) for supplying electrical power the central digital controller 24 and the digital controller 25 as well as to the various electrical components of the watercraft 10. Of course, the digital controller 25 can have its own electrical power supply (e.g., a battery) if desired.

The central digital controller 24 can be a microcomputer. The central digital controller 24 includes a processor 24a, such as a CPU (Central Processing Unit) and memory 24b (computer storage) such as a ROM (Read Only Memory) and a RAM (Random Access Memory). The central digital controller 24 can also include other conventional components such as an input interface circuit and an output interface circuit. The processor 24a of the central digital controller 24 is programmed to control the various components of the boat 10 such as adaptive cruise control, autopilot control, satellite positioning control, etc. The memory 24b of the central digital controller 24 stores processing results, detection results and control programs such as ones for controlling the watercraft 10. For example, the RAM stores statuses of operational flags and various control data, while the ROM stores the control programs for various operations.

In the illustrated embodiment, the central digital controller 24 is programmed to control the propulsion units 22 in accordance with operation signals from the steering wheel 16 and the remote control 18 as well as control signals from the watercraft control system 12. The basic controls of the propulsion units 22 in accordance with the operation signals from the steering wheel 16 and the remote control 18 are relatively conventional, and thus, the basic controls of the propulsion units 22 will not be discussed in detail herein. The central digital controller 24 is also programmed to automatically control the at propulsion units 22 based on detection results of sensors or detectors.

While the central digital controller 24 and the watercraft control system 12 are illustrated as separate components in which the watercraft control system 12 is connected to the network of the watercraft 10, the watercraft control system 12 can be integrated with the central digital controller 24. In other words, here, the watercraft control system 12 is an add-on component that is plugged into the network of the watercraft 10. Thus, as illustrated in FIG. 5, the watercraft control system 12 includes its own digital controller 25 having at least one processor 25a, such as a CPU (Central Processing Unit) and memory 25b (computer storage) such as a ROM (Read Only Memory) and a RAM (Random Access Memory). On the other hand, if the watercraft control system 12 is fully integrated into the watercraft 10, then the watercraft control system 12 can use the central digital controller 24 to carry out the auto-track & follow mode.

The digital controller 25 is configured to communicate with the detector 14 to receive a detection signal from the detector 14. Here, for example, the digital controller 25 is provided with a communication interface 25c that is used to communicate with the detector 14 either wirelessly or via a wired connection to the network of the watercraft 10. Thus, the digital controller 25 can also communicate with the onboard computer system of the watercraft 10 via the communication interface 25c. Here, for example, the digital controller 25 is plugged into a network interface controller NIC (e.g., a MicroAutoBox by dSpace), and the detector 14 is plugged into a USB port of the communication interface 25c of the digital controller 25. The processor 25a of the digital controller 25 (the GPU 25) communicates with the digital controller 24 (the BCU). In this way, the digital controller 25 can communicate with the central digital controller 24 and the propulsion units 22 to control the propulsion force of the watercraft 10 as well as communicate with the other components of the watercraft 10 that are connected to the network of the watercraft 10.

Here, the detection signal from the detector 14 is a pair of images since the detector 14 includes a stereo camera. By using a stereo camera as the detector 14 can detect the presence of the lead watercraft W as well as be used to determine the distance between the lead watercraft W and the watercraft 10. Also, the images captured by the detector 14 can be used to provide the predetermined lateral offset amount OS.

Using the detection results of the detector 14, the digital controller 25 then controls a propulsion direction of the watercraft 10 and a propulsion force of the watercraft 10 so that the watercraft 10 tracks and follows the lead watercraft W at the target following distance $Z_{des}$. In the first embodiment, the digital controller 25 is configured to selectively carry out at least one of differential steering and rudder steering to change the propulsion direction of the watercraft 10 in order to track and follow the lead watercraft W, as discussed later.

In the case in which a stereo camera is utilized for the detector 14, the digital controller 25 (GPU) is provided with an image detection program. The processor 25a of the digital controller 25 is connected to the detector 14 (e.g., the camera) and receives the image data of the camera view in front of the watercraft 10. From the image data, the processor 25a of the digital controller 25 detects the lead watercraft W within the image that is captured by the detector 14, and determines lateral and longitudinal positions of the lead watercraft W relative to the host watercraft 10. The lateral and longitudinal positions of the lead watercraft W are then communicated from the digital controller 25 (GPU) to the digital controller 24 (BCU).

The image detection program can use any detection method available. The detection method that is used will depend on the types of devices used as the detector 14. For example, the image detection program of the digital controller 25 can use either (1) a hypothesis generation methodology where the locations of potential objects in an image are hypothesized by using watercraft information such as symmetry, color, shadow, corners, horizontal/vertical edges, texture, and watercraft lights; or (2) a hypothesis verification methodology that verifies the presence of an object in an image by analyzing differences between the images observed and known object models or templates. If a stereo camera is utilized for the detector 14, then a disparity map process can be used to process the corresponding pixels in the two (right and left) images to find the differences for determining the presence of a watercraft in the images. Alternatively, when using a stereo camera for the detector 14, then an inverse perspective mapping process can be used for determining the presence of a watercraft in the images. Since these methodologies for determining the presence of an object in an image are known, these methodologies will not be discussed in further detail herein.

Also, the lead watercraft W can be further provided with a marker that assists in identifying the presence of the leading watercraft by the detector 14. For example, the marker can be a plurality of LED light sources that are position so that the light from LED light sources can be viewed from a rear side of the lead watercraft W in the longitudinal direction. Alternatively, the marker can be a balloon or a disk that is provided with a particular shape or pattern. In this way, the marker can contribute to the detector 14 easily locating the leading watercraft W. Moreover, the detection method utilized for determining the presence of a leading watercraft is not limited to these methodologies. In any case, the digital controller 25 has a watercraft detection program that detects a presence of the lead watercraft W based on a detection result of the detector 14.

Still referring to FIG. 5, each of the propulsion units 22 basically includes an internal combustion engine 26 (i.e., a drive source) and a propeller 28 (i.e., a propulsor). Here, each of the propulsion units 22 further includes an engine control unit 30 (ECU). Alternatively, for example, the engine control units 36 can be omitted and the control of the internal combustion engines 26 (hereinafter "the engines 26") can be performed by the central digital controller 24. Here in FIG. 5, the engines 26 are referred to as first engine, second engine and third engine to distinguish the engines 26. Likewise, in FIG. 5, the propellers 28 are referred to as first propeller, second engine and third propeller. Also, in FIG. 5, the engine control units 36 are referred to as first ECU, second ECU and third ECU. Each of the engine control units 30 is a digital controller similar in configuration to the configuration of the central digital controller 24 that is previously discussed. Each of the engine control units 30 is programmed to control its respective propulsion unit 22 to independently generate the propulsion forces of the propulsion units 22, respectively, and to independently steer or turn the propulsion units 22, respectively, in order to propel and steer the watercraft 10.

Referring back to FIG. 4, one of the propulsion units 22 is illustrated in more detail. Since the construction of the propulsion units 22 are the same, the description of the propulsion unit 22 illustrated in FIG. 4 also applies to the other propulsion units 22. The propulsion unit 22 is mounted to a rear portion 20c of the hull 20 in a conventional manner. The engine 26 is connected to the propeller 28 via a drive shaft 31 and a propeller shaft 32. The propeller shaft 32 is connected to the drive shaft 31 through a drive transmission 33. The engine 26 rotates the propeller 28 via the drive shaft 31 and the propeller shaft 32 to generate a thrust for propelling the watercraft 10. The drive transmission 33 switches the rotational direction of the power to be transmitted from the drive shaft 31 to the propeller shaft 32. The drive transmission 33 includes, for instance, a plurality of gears and a clutch that changes meshing of the gears. The drive shaft 31 is operatively connected to a crankshaft 34 of the engine 26 so that rotation of the crankshaft 34 is transmitted to the drive shaft 31 which in turn transmits rotation to the propeller shaft 32 to rotate the propeller 28. The engine 26, the drive shaft 31, the propeller shaft 32 and the drive transmission 33 are provided in a housing 36.

The propulsion unit 22 is provided with a shift actuator 38 that is electrically connected to the engine control unit 30 as seen in FIG. 4. The shift actuator 38 includes, for example, an electric motor or other types of actuators that is configured to switch an operating position of the drive transmission 33 of the propulsion unit 22 to a forward position to generate a forward propulsion force, a reverse position to generate a reverse propulsion force, or a neutral position. Thus, the shift actuator 38 is configured to operate the drive transmission 33 to change rotational direction of the propeller shaft 32 and the propeller 28 between a forward drive thrust and a reverse drive thrust. Preferably, the shift actuator 38 is an electric actuator that is electrically controlled by the engine control unit 30. The engine control unit 30 is programmed to operate the shift actuator 38 to control the drive transmission 33 based on a control signal received from the central digital controller 24 and/or the digital controller 25 of the watercraft control system 12. In this way, the central digital controller 24 and/or the digital controller 25 can carry out differential steering and switching between a forward propulsion and a reverse propulsion.

The propulsion unit 22 is also provided with a throttle actuator 40 that is electrically connected to the engine control unit 30 as seen in FIG. 4. The throttle actuator 40 includes, for example, an electric motor or other types of actuators for change the output of the engine 26. Namely, the throttle actuator 40 changes an opening degree of a throttle valve to adjust the output or speed of the engine 26. Preferably, the throttle actuator 40 is an electric actuator that is electrically controlled by the engine control unit 30. The propulsion unit 22 is also provided with an engine speed sensor 42 that detects a rotational speed of the crankshaft 34 of the engine 26 to determine an engine rotational speed of the engine 26. The detection signal of the engine speed sensor 42 is transmitted to the engine control unit 30, the central digital controller 24 and/or the digital controller 25. The engine control unit 30 is programmed to operate the throttle actuator 40 to control the speed of the engine 26 based on a control signal received from the central digital controller 24 and/or the digital controller 25 of the watercraft control system 12. In this way, the central digital controller 24 and/or the digital controller 25 can carry out throttle control of the engine 26.

The propulsion unit 22 is also provided with a steering actuator 44 that is electrically connected to the engine control unit 30 as seen in FIG. 4. The steering actuator 44 includes, for example, a hydraulic or electric cylinder, or other types of actuators that is provided to turn the propulsion unit 22 relative to the watercraft 10. The propulsion unit 22 is also provided with a steering angle sensor 46 that detects a steering angle of the propulsion unit 22. The steering angle sensor 46 can be, for example, a stroke sensor of the hydraulic cylinder of the steering actuator 44. The steering angle sensor 46 transmits the detection result to the engine control unit 30, the central digital controller 24 and/or the digital controller 25. The engine control unit 30 is programmed to operate the steering actuator 44 to control the propulsion direction of the watercraft 10.

Referring again to FIG. 5, with this configuration of the watercraft 10, the propulsion units 22 can be operated to carry out rudder control (i.e., turning the propulsion unit as a rudder) and/or differential control (i.e., operating at least one of the propulsion units with a different thrust output with respect to at least one other of the propulsion units) for changing the propulsion direction of the watercraft 10. Thus, the watercraft 10 has three steering units 48 with each of the steering units 48 having one of the steering actuator 44 for carrying out rudder control. Alternatively, with certain watercrafts, either the rudder control or the differential control can be omitted from the auto-track & follow mode of the watercraft control system 12 as needed and/or desired.

In the first embodiment, a driver input provided to the steering wheel 16 is electronically communicated through the central digital controller 24. A steering sensor (not shown) is in communication with at least one of the steering wheel 16 and a steering shaft that is associated with the steering wheel 16. The steering sensor 46 is arranged to provide a signal indicative of a rotational position, angular position, input force, or input torque applied to at least one of the steering wheel 16 or a steering shaft (not shown) associated with the steering wheel 16 to the central digital controller 24. The central digital controller 24 is arranged to receive the signal and provide commands or signals to the engine control units 30 of the propulsion units 22 and/or the steering actuator 44 to move the propulsion units 22 as a rudder. However, when the watercraft control system 12 is in the auto-track & follow mode, the driver inputs are not needed, and the propulsion units 22 and/or the steering actuator 44 are controlled by the central digital controller 24 and/or the digital controller 25 based on detection signals from various sensors.

As seen in FIG. 5, for example, the watercraft 10 can be provide with a running speed detector 50 (e.g., a GPS speedometer, a pitot speedometer, etc.), a satellite navigation receiver 52 (e.g., a Global Positioning System (GPS) receiver, a Navigation Satellite System (NSS) receiver, or a Global Navigation Satellite System (GNSS) receiver), and a heading sensor 54 (e.g., on-board gyro and tilt sensors). The running speed detector 50, the satellite navigation receiver 52 and the heading sensor 54 can be integrated into a single unit that provides speed data, heading data and position data. The running speed detector 50, the satellite navigation receiver 52 and the heading sensor 54 are connect to the digital controller 25 by the network of the watercraft 10 so that signals are communicated to the digital controller 25 via the network of the watercraft 10. The speed of the watercraft 10 can be provided to the digital controller 25 by a detection signal from the running speed detector 50, or can be provided to the digital controller 25 a GNSS signal that is received by the satellite navigation receiver 52. The position of the watercraft 10 can be provided to the digital controller 25 based on the GNSS signal that is received by the satellite navigation receiver 52. The heading of the watercraft 10 can be provided to the digital controller 25 based on the heading sensor 54. Thus, the digital controller 25 receives the speed of the watercraft 10, the relative position of the watercraft 10, and the relative heading of the watercraft 10 based on detection results from various receivers, detectors and/or sensors.

Figure 6:
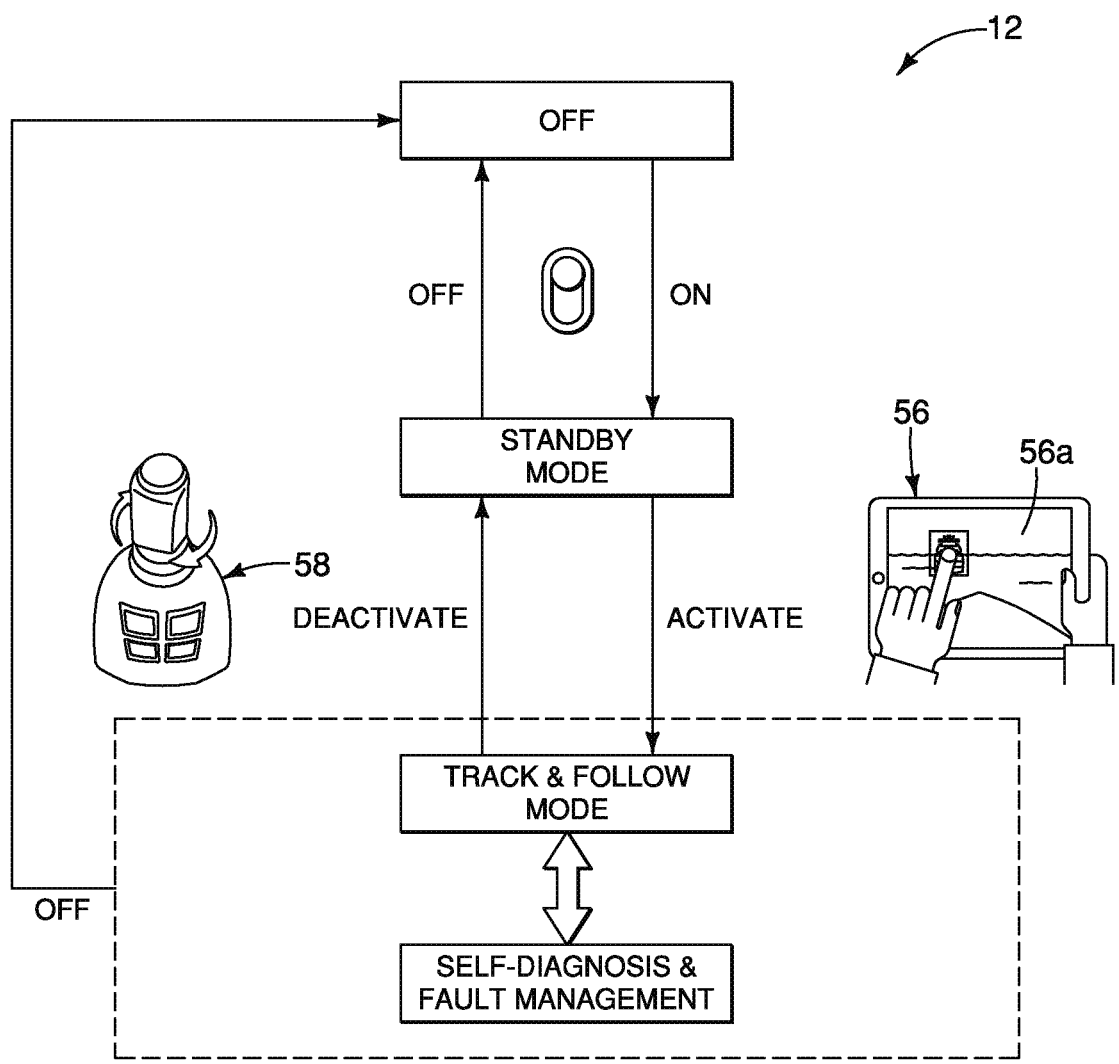
FIG. 6 is a simplified high level logic diagram illustrating the auto-track & follow mode executed by the watercraft control system.

Preferably, as seen in FIG. 6, the watercraft control system 12 further comprises a user interface such as a Multi-Function Display, a wireless tablet 56 and/or a joystick 58 that communicates with the digital controller 25. The tablet 56 preferably has a processor that communicates with the processor 25a of the digital controller 25 and a display screen, such that the tablet 56 displays the current image from the detector 14 as well as other information related to the auto-track & follow mode such as the distance between the watercraft 10 and the lead watercraft W, the speed of the watercraft 10, the heading of the watercraft 10, etc.

Here, the joystick 58 is provided on the watercraft body 20 and programmed to be used to operate with the wireless tablet 56 and the digital controller 25. In this way, the user can use the wireless tablet 56 and/or the joystick 58 to activate and deactivate the auto-track & follow mode. In the first embodiment, the wireless tablet 56 (i.e., the user interface) includes a touch screen 56a (i.e., a user input) that is used to select the lead watercraft W. Thus, the digital controller 25 is configured to track and follow the lead watercraft based on a selection of the lead watercraft W in response to an input from a user input (e.g., the touch screen 56a and/or the joystick 58).

Alternatively, the watercraft control system 12 can use a user interface 60 that is built into the watercraft 10 instead of or in conjunction with the wireless tablet 56. The user interface 60 is often referred to as a Multi-Function Display. The user interface 60 of the watercraft 10 can be a touch screen display, or a display without a touch screen, and one or more knobs and/or buttons.

The auto-track & follow mode executed by the digital controller 25 will now be discussed with reference to FIGS. 6 to 16. As seen in FIG. 6, a state transition logic is illustrated for the watercraft control system 12. When the watercraft 10 is started, the central digital controller 24 and the digital controller 25 are initialized and various other components are automatically activated including the detector 14. Before the user selects a lead watercraft W to track and follow, the watercraft control system 12 will enter a standby mode. In standby mode, the watercraft control system 12 waits for the user to select a watercraft to track and follow, but the digital controller 25 has not yet taken over the controls from the user. For the digital controller 25 to take over, a user must select a lead watercraft on the tablet 56, or using the joystick 58. Alternatively, the digital controller 25 can be woken up by using the user interface 60 of the watercraft 10.

Figure 12:
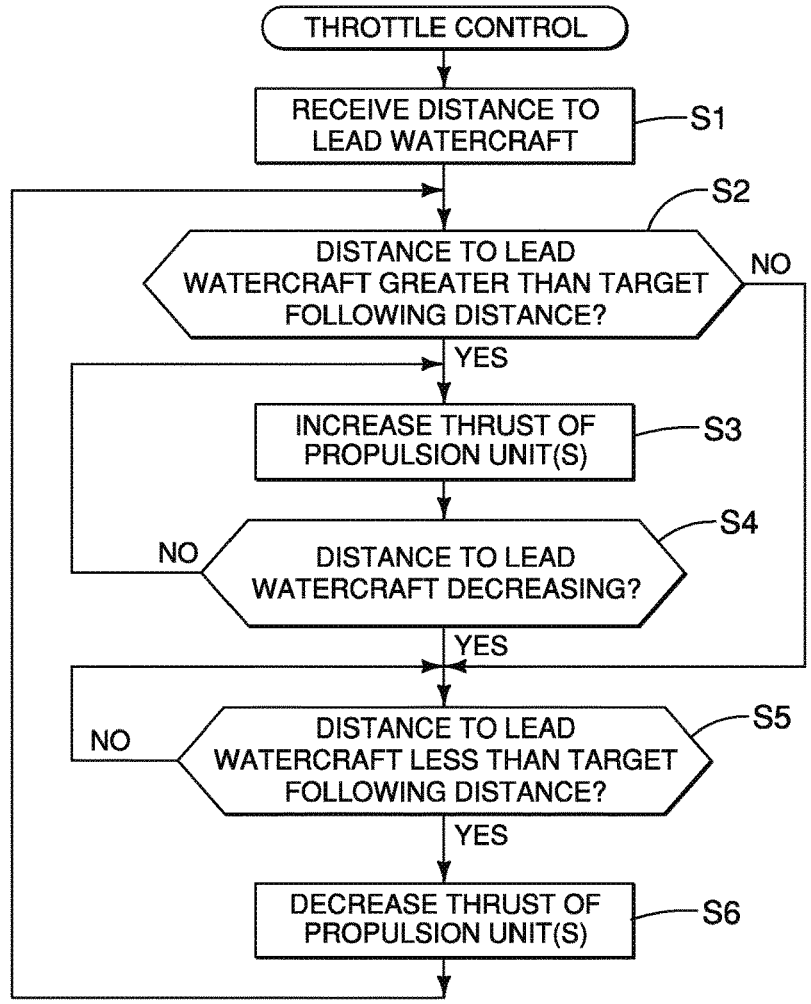
FIG. 12 is an example of a throttle (longitudinal) control flow chart of the throttle executed by the watercraft control system during the auto-track & follow mode.
Figure 13:
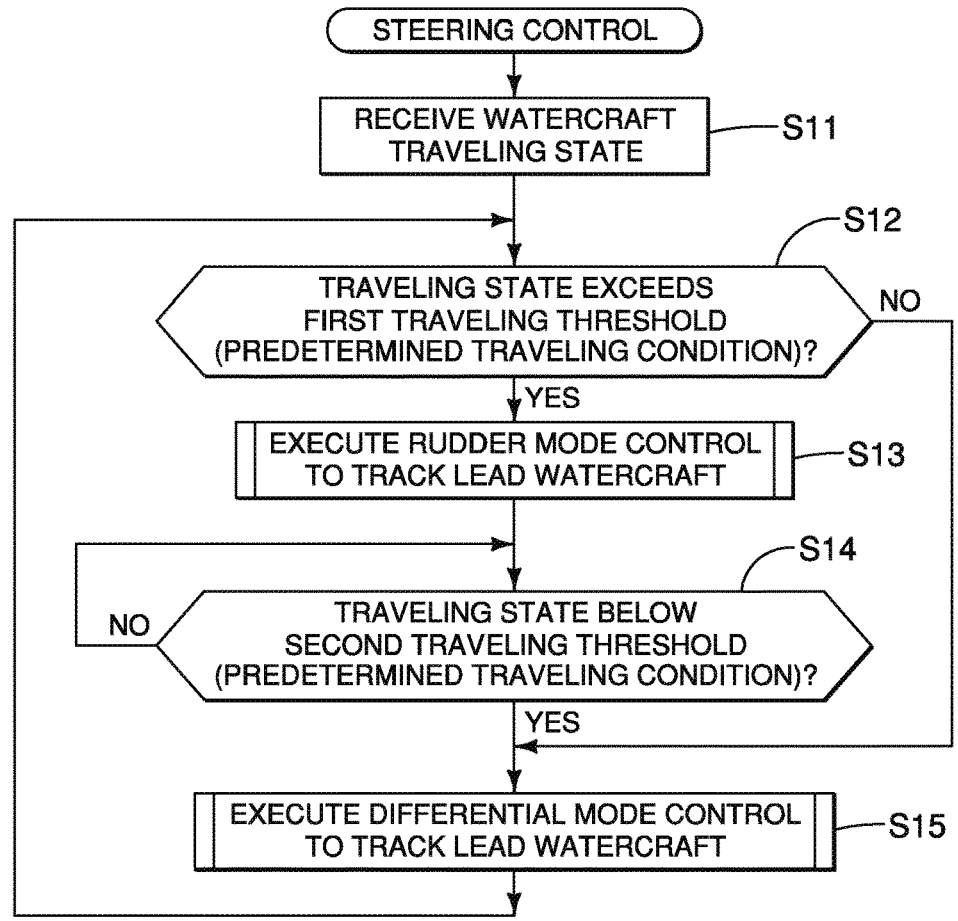
FIG. 13 is an example of the state transition logic that selects a steering (lateral) control to be executed by the watercraft during the auto-track & follow mode.

Once the user selects a lead watercraft (e.g., the lead watercraft W), the digital controller 25 activates the lateral and longitudinal control systems which allow for the automatic watercraft tracking and following process (i.e., the user engage the auto-track & follow mode). While in the auto-track & follow mode, there are no necessary inputs required from the driver of the watercraft 10, unless the watercraft control system 12 experiences a failure or the driver of the watercraft 10 requests the auto-track & follow mode to be disengaged. While in the auto-track & follow mode, the control processes of FIGS. 12 and 13 are simultaneously executed to control both the steering (propulsion direction) and the throttle (propulsion force and/or propulsion direction).

Figure 7:
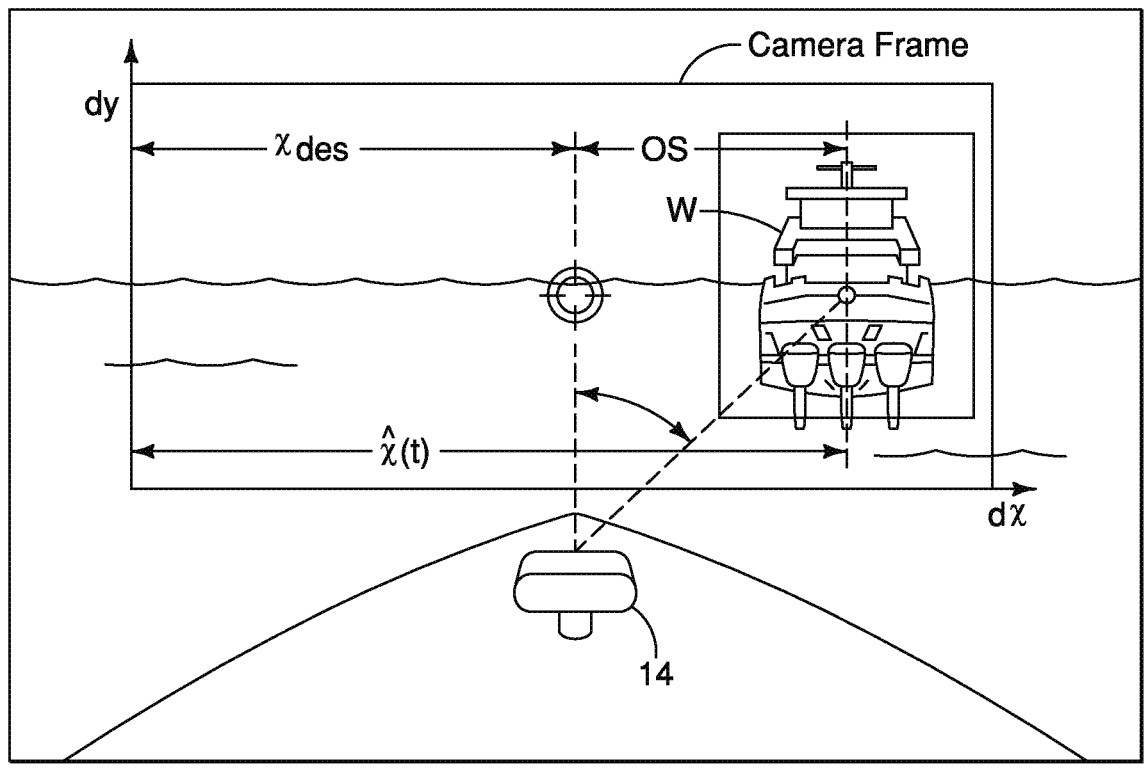
FIG. 7 is a front landscape view looking forward from the host watercraft at a lead watercraft cruising ahead of the host watercraft that includes a field of view of the camera in which the host watercraft is tracking and following the lead watercraft such that the host watercraft's path is offset from the lead watercraft's path.
Figure 8:
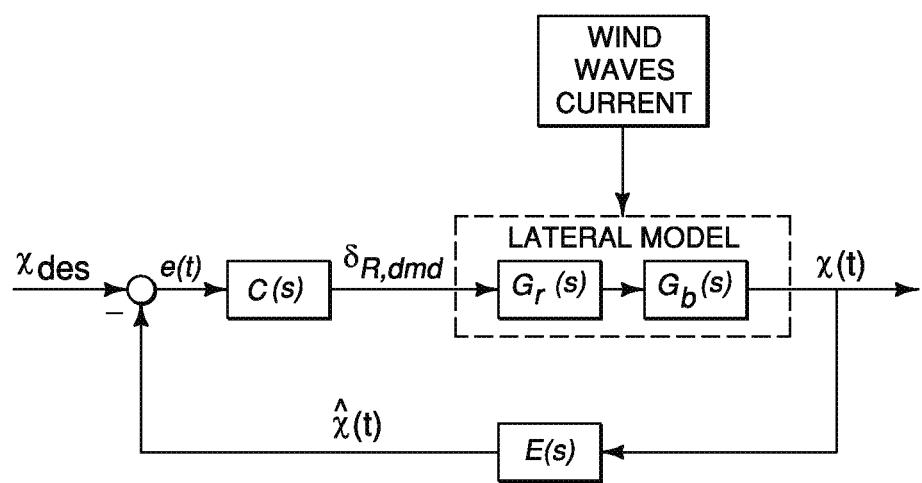
FIG. 8 is an example of a block diagram of the on-board lateral control system executed by the digital controller of the watercraft control system during the auto-track & follow mode.
Figure 9:
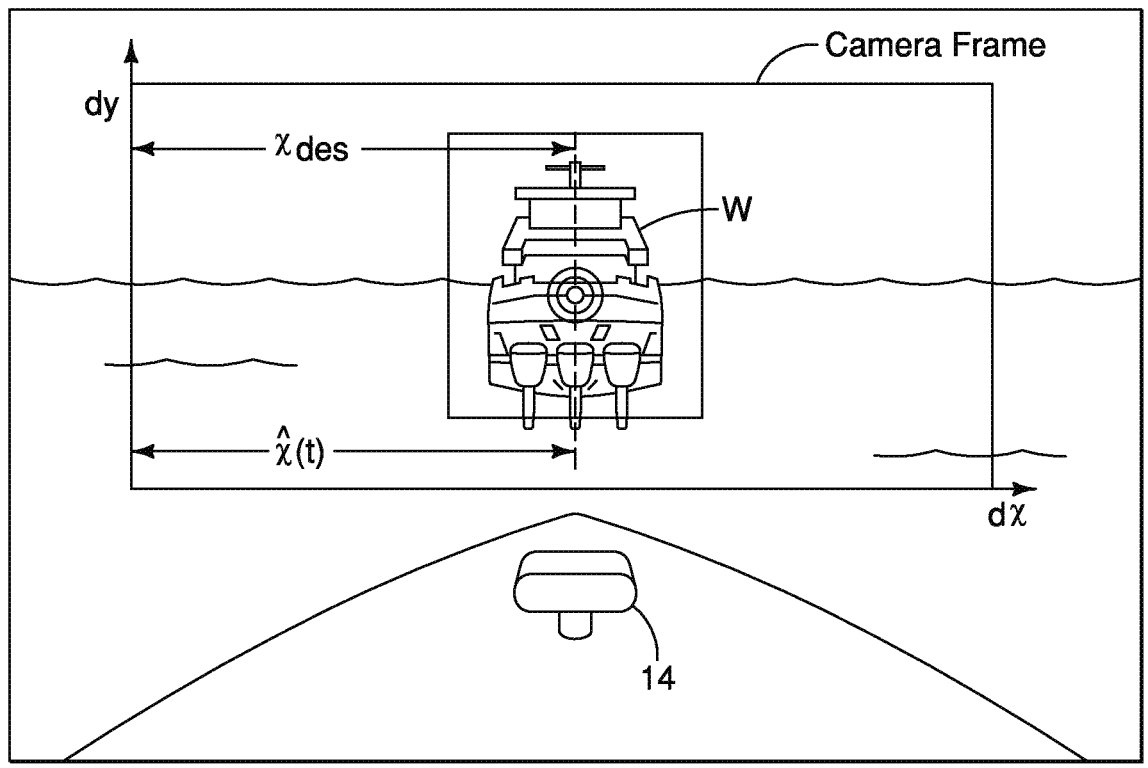
FIG. 9 is a front landscape view looking forward from the host watercraft at a lead watercraft cruising ahead of the host watercraft that includes a field of view of the camera in which the host watercraft is tracking and following the lead watercraft such that the host watercraft's path coincides with the lead watercraft's path.

Referring to FIGS. 7 and 8, lateral control of the watercraft 10 during the auto-track & follow mode will be discussed. As mentioned above, lateral control of the watercraft 10 can be achieved by differential thrust control and rudder control. During nominal forward speed operation, the watercraft 10 employs a pure-pursuit tracking method by modifying its rudder based on a difference between a target tracking azimuth angle and an actual azimuth angle. As seen in FIG. 7, a font landscape view is illustrated looking forward from the watercraft 10 at the lead watercraft W that includes a field of view of the detector 14 (e.g., the stereo camera). From the image (camera frame) obtained by the detector 14 (e.g., the stereo camera), the digital controller 25 can both detect the lead watercraft W and determine the distance of the watercraft 10 from the lead watercraft W.

Also, the host watercraft 10 can track the lead watercraft W at a predetermined lateral offset amount OS of the host watercraft path PH from the lead watercraft path PL based on a default setting or a user setting. Basically, the user can choose to a track and follow path using the camera image. For example, the number of pixels can be normalized such that the middle or center of the camera image is set to "0%", and the pixel at each edge of the camera image is set to −100% and 100%. In short, the user specifies to the digital controller 25 at which percentage of the frame to track the lead watercraft W. In this way, the user sets the predetermined lateral offset amount OS of the host watercraft path PH from the lead watercraft path PL. For example, the default setting for the host watercraft path PH to track the lead watercraft W can be set to 50%, which would result on the host watercraft 10 tracking to the left of the lead watercraft W.

As illustrated in FIG. 8, lateral feedback control is employed based on the detection results from the image in FIG. 7 to control a rudder angle $\delta_R$ of the host watercraft 10. More specifically, as seen in FIG. 8, the digital controller 25 regulates the heading of the watercraft 10 through slight adjustments on the rudder angle $\delta_R$ based on the current location of the lead watercraft W, which is measured using the camera's coordinate system. In other words, feedback control is employed to control the heading of the host watercraft 10 by providing a desired heading point $x_{des}$ and comparing this value with an estimated current heading point x(t), which varies at each point in time because it depends on the location of the lead watercraft 10.

In the case of the desired heading point $x_{des}$ aligning with the desired heading point $x_{des}$, the goal of the lateral feedback control is to drive the resulting error $e_{lat}$ to zero (i.e., $e_{lat}=x_{des}-x(t)$), even in the presence of disturbances such as wind, wave and currents which may act to drive the watercraft 10 away from the desired tracking point. In the case of the watercraft path PH being offset from the lead watercraft path PL, the goal of the lateral feedback control is to drive the resulting error to the amount of the desired offset, even in the presence of disturbances such as wind, wave and currents which may act to drive the watercraft 10 away from the desired tracking point. Furthermore, as seen in FIG. 8, the digital controller 25 controls the propulsion direction using either rudder control or differential control such that the desired heading point $x_{des}$ aligns with the estimated current heading point x(t). In this way, the watercraft path PH of the watercraft 10 tracks and follows in the lead watercraft path PL of the lead watercraft W as seen in FIG. 1.

Alternatively, the digital controller 25 controls the propulsion direction using either rudder control or differential control such that the desired heading point $x_{des}$ is not zero (or in the middle of the camera frame) as seen in FIG. 7. In this case, the host watercraft path PH will be offset from the lead watercraft path PL by the predetermined lateral offset amount OS which can be either a default setting or set by the user. In this way, the watercraft path PH of the watercraft 10 is offset from the lead watercraft path PL of the lead watercraft W during tracking and following the lead watercraft W as seen in FIGS. 2 and 7. Also, preferably, the user can twist or tilt the joystick 58 to temporarily offset the watercraft path PH from the lead watercraft path. Thus, the watercraft path PH will remain offset from the lead watercraft path PL as long as the user twists or tilts the joystick 58 from its rest or neutral position. Alternatively, the desired azimuth angle can be determined from the desired heading point $x_{des}$ and can be controlled by the user from the touch screen 56a and/or the user interface 60 (Multi-Function Display) of the watercraft 10. Of course, it will be apparent from this disclosure that the watercraft path PH with respect to the lead watercraft path PL can be controlled and/or set by the user in a variety of ways and is not limited to the above mentioned ways.

Figure 10:
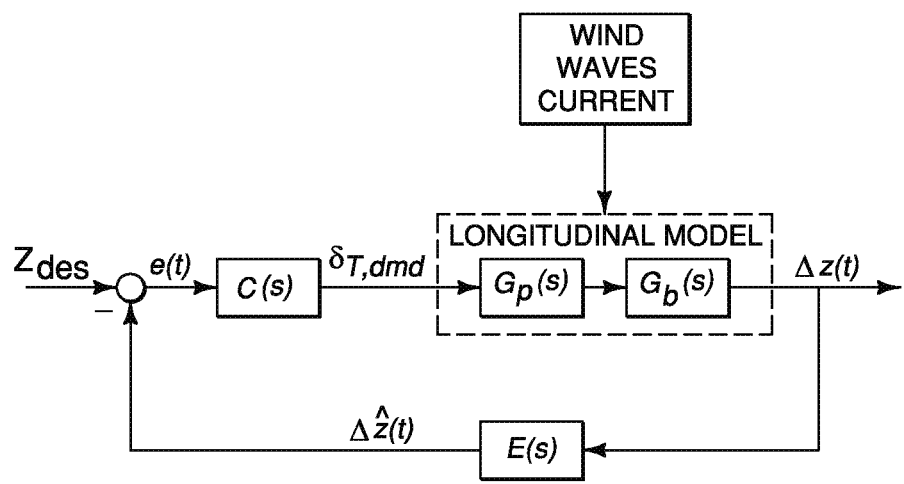
FIG. 10 is an example of a block diagram of the on-board longitudinal control system executed by the digital controller of the watercraft control system together with the on-board lateral control system of FIG. 8 during the auto-track & follow mode.
Figure 11:
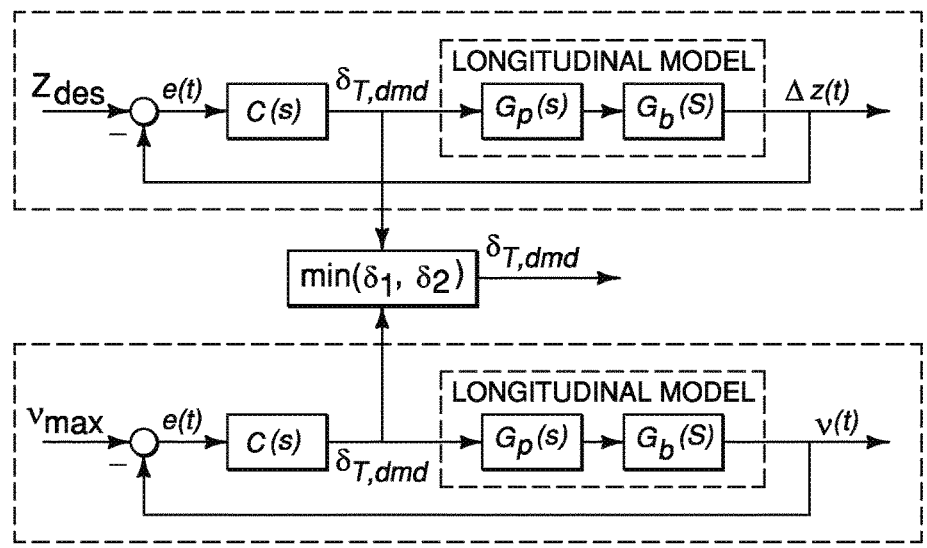
FIG. 11 is another example of a block diagram of a longitudinal control executed by the watercraft control system during the auto-track & follow mode but includes a maximum speed limiter that prevents the host vehicle from tracking at speeds higher than the maximum tracking velocity set by the user.

Referring to FIGS. 10 and 11, longitudinal control of the watercraft 10 during the auto-track & follow mode will be discussed. As mentioned above, longitudinal control of the watercraft 10 can be achieved by adjusting the propulsion forces of the propulsion units 22. The longitudinal control process employed in the auto-track & follow mode allows for the watercraft 10 to follow the lead watercraft W at some target following distance $Z_{des}$, which can also be referred to as a target or desired following distance of the watercraft 10, as long as the speed of the tracking host watercraft is never higher than some threshold specified by the user. If the speed of the lead watercraft W is ever greater than the maximum allowable speed set by the user, then the digital controller 25 automatically disengages the auto-track & follow mode and returns to a cruise control mode, where steering is handed back to the driver of the host watercraft 10, but speed is regulated by the digital controller 25. This transition is preferably indicated by a beep to alert the user.

On the other hand, while the speed of the lead watercraft W remains lower the maximum allowable speed set by the user for the watercraft 10, the digital controller 25 will regulate the target following distance $Z_{des}$ to the lead watercraft W by making gentle automatic modifications to the throttle based on the difference between the actively calculated target following distance $Z_{des}$ and the estimated current distance as perceived by the detector 14. This actively calculated target following distance $Z_{des}$ is preferably set by a prescribed constant time-headway rule. The constant time-headway rule is nothing more than the time to take for the watercraft 10 to contact with the lead watercraft W if the lead watercraft W were to suddenly stop with the watercraft 10 maintaining its instantaneous speed. If the target following distance $Z_{des}$ is calculated such that the time-headway remains constant, the string stability is guaranteed. This guarantees that multiple watercraft can operate behind each other, each becoming the lead watercraft to the watercraft behind. The target following distance $Z_{des}$ is given by the follow formula:

$$Z_{des}=\tau*v+dz$$

Note that the target following distance $Z_{des}$ is a function of the velocity v of the host watercraft 10. If the velocity v of the watercraft 10 becomes zero, then the target following distance $Z_{des}$ becomes equal to a separation distance dz (i.e., Z=dz). The user has the ability to change the value of the constant $\tau$ as needed and/or desired. However, if the constant $\tau$ is changed too fast, then undesirable accelerations of the watercraft 10 may occur. To solve this issue, a rate limiter may be used to prevents the value of the target following distance Z from changing too fast, despite a user input.

As seen in FIG. 10, feedback control is employed based on the estimated following distance $\Delta z(t)$ provided by the detector 14, where the output of the digital controller 25 becomes the prescribed throttle level $\delta_T$ to the throttle actuators 40 of the engines 26 of the watercraft 10 in order to properly maintain the target following distance $Z_{des}$. More specifically, as seen in FIG. 10, the digital controller 25 regulates the propulsion force of the watercraft 10 to obtain the following condition: $\Delta z(t)=Z_{des}$, even in the presence of disturbances such as wind, waves, and current.

Instead of the longitudinal control of the watercraft 10 by the digital controller 25 being based mainly on the target following distance $Z_{des}$, the longitudinal control of the watercraft 10 by the digital controller 25 can be a based on a balance between the set speed (maximum velocity $v_{des}$) and the target following distance $Z_{des}$. As seen in FIG. 11, a balance between the set speed (maximum velocity $v_{des}$) and the target following distance $Z_{des}$ can be easily performed using two feedback controls by a comparison of the two output throttles. In either case, the minimum throttle is always selected as the active throttle. An anti-windup scheme can be employed on each of the feedback controls since they each have an integrator to minimize steady state errors. This keeps each of the corresponding throttles from running away to infinity while one of the feedback controls is active vs the other. When the lead watercraft W moves faster than our maximum speed, throttle demand for the distance feedback control approaches toward its limit, and hence the throttle demand for the velocity feedback control becomes the active throttle. Similarly, when the lead watercraft W is moving slower than our maximum speed, the throttle demand for the velocity feedback control approaches toward its limit, making the throttle demand for the distance feedback control the active throttle.

Also, if the auto-track & follow mode is started while the watercraft 10 is too far from the desired tracking distance, then the auto-track & follow mode can result in an uncomfortable accelerations of the watercraft 10. This happens because there is an immediate large error on the distance feedback control when the auto-track & follow mode is first engaged, and therefore the distance feedback control reacts aggressively to minimize this situation. Through the introduction of input shaping logic, the digital controller 25 is able to suppress the distance feedback control to slowly move towards the target following distance $Z_{des}$ through an exponential decaying function, yielding a smooth transient.

The goal of the digital controller 25 is to minimize the error between the target following distance $Z_{des}$ and the estimated current distance $\Delta z(t)$ to the lead watercraft. The digital controller 25 samples the image data from the detector 14 at a prescribed interval, and the digital controller 25 then increases or decreases the throttles of the engines 26 based on whether the watercraft 10 is closer or farther from the target following distance $Z_{des}$ at that point in time.

Referring now to FIG. 12, one example of a throttle (longitudinal) control flow chart is illustrated that is executed by the digital controller 25 of the watercraft control system 12 during the auto-track & follow mode. More specifically, the digital controller 25 is configured to output at least one control command related to a propulsion force of the watercraft 10 to at least one of the propulsion units 22 maintain the target following distance $Z_{des}$ behind the lead watercraft W. Thus, the digital controller 25 controls the throttles of the engines 26 of the propulsion units 22 to maintain the target following distance $Z_{des}$ behind the lead watercraft W while also performing the steering control to allow the watercraft 10 to track the lead watercraft W as explained later. As mentioned above, the target following distance $Z_{des}$ can be adjusted using the tablet 56, the joystick 58 and/or the user interface 60 of the watercraft 10.

In step S1, the processor 25a of the digital controller 25 determines the distance to the lead watercraft W. In the first embodiment, the digital controller 25 receives an estimated distance signal from the detection system (the detector 14 and the processor 25a), which first calculates the estimated current distance z(t) from the watercraft 10 to the lead watercraft W using the detection signal from the detector 14. Then, the throttle control process proceeds to step S2.

In step S2, the digital controller 25 determines whether the estimated current distance z(Q) from the watercraft 10 to the lead watercraft W is greater than the target following distance $Z_{des}$. If the digital controller 25 determines the estimated current distance z(t) from the watercraft 10 to the lead watercraft W is greater than the target following distance $Z_{des}$, then the throttle control process proceeds to step S3. If the digital controller 25 determines the estimated current distance z(t) from the watercraft 10 to the lead watercraft W is equal to or less than the target following distance $Z_{des}$, then the throttle control process proceeds to step S5.

In step S3, the digital controller 25 outputs a signal to the engine control units 30 of the propulsion units 22 to increase the thrust of the propulsion units 22. This is accomplished by the throttle actuator 40 increasing the opening degrees of the throttle valves of the engines 26 by a predetermined amount. Then, the throttle control process proceeds to step S4.

In step S4, the digital controller 25 determines whether the estimated current distance z(t) from the watercraft 10 to the lead watercraft W is decreasing or not. In other words, the digital controller 25 determines if the watercraft 10 is getting closer to the lead watercraft W or not. If the digital controller 25 determines the estimated current distance z(t) from the watercraft 10 to the lead watercraft W is decreasing, then the throttle control process proceeds to step S5. If the digital controller 25 determines the estimated current distance z(t) from the watercraft 10 to the lead watercraft W is not decreasing, then the throttle control process proceeds back to step S3 to further increase the opening degrees of the throttle valves 40 of the engines 26 by a predetermined amount.

In step S5, the digital controller 25 determines whether the estimated current distance z(t) from the watercraft 10 to the lead watercraft W is less than the target following distance $Z_{des}$. If the digital controller 25 determines the estimated current distance z(t) from the watercraft 10 to the lead watercraft W is less than the target following distance $Z_{des}$, then the throttle control process proceeds to step S6. If the digital controller 25 determines the estimated current distance z(t) from the watercraft 10 to the lead watercraft W is equal to or greater the target following distance $Z_{des}$, then the throttle control process repeats step S5 until the estimated current distance z(t) from the watercraft 10 to the lead watercraft W becomes less than the target following distance $Z_{des}$.

In step S6, the digital controller 25 outputs a signal to the engine control units 30 of the propulsion units 22 to decrease the thrust of the propulsion units 22. This is accomplished by the throttle actuator 40 decreasing the opening degrees of the throttle valves of the engines 26 by a predetermined amount. Then, the throttle control process proceeds back to step S2.

Figure 14:
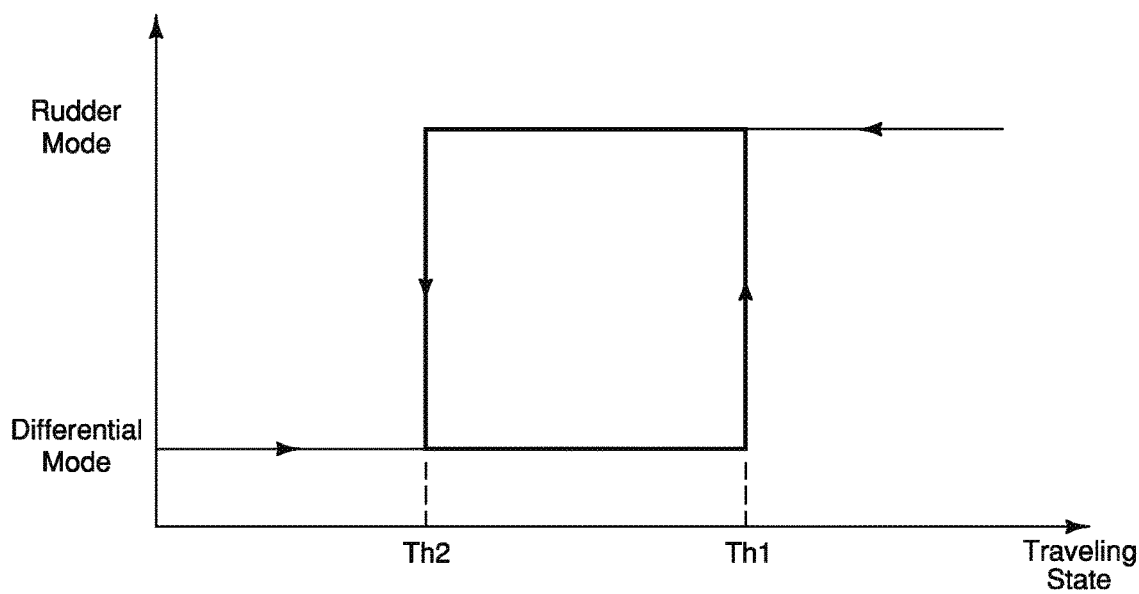
FIG. 14 is a graph that illustrates the hysteresis based mode switching process described in FIG. 13.

In parallel to the previously discussed on-board longitudinal control system, the digital controller 25 also runs an on-board lateral control system whose sole goal is to steer the host watercraft 10 behind the lead watercraft. This lateral control system is configured to selectively switch between rudder control and differential control based on a predetermined traveling condition (e.g., the speed of the watercraft 10, the speed of the engines 26, etc.), for example, as indicated in FIGS. 13 and 14. This switching function is desirable since at low speeds the effectiveness of the rudder reduces to zero for some watercrafts at zero speed.

Here in FIG. 13, the predetermined traveling condition includes a first traveling threshold Th1 and a second traveling threshold Th2 that is smaller than the first traveling threshold Th1 (i.e., Th2<Th1). For example, the first traveling threshold Th1 can be an upper watercraft cruising speed or an upper engine speed (rpm), while the second traveling threshold Th2 can be a lower watercraft cruising speed or a lower engine speed (rpm). The digital controller 25 is configured to switch the control from the differential mode to the steering mode upon determining a current traveling condition of the watercraft exceeds the first traveling threshold Th1, and to switch the control from steering mode to the differential mode upon determining the current traveling condition of the watercraft falling below the second traveling threshold M2. This hysteresis logic allows for smooth transitions while operating near a desired switching point (e.g., a desired cruising speed or a desired engine speed).

Referring now to FIG. 13, one example of a steering (lateral) control logic diagram flow chart of the steering control is illustrated that is executed by the digital controller 25 of the watercraft control system 12 during the auto-track & follow mode. Here, the digital controller 25 controls the shift actuators 38, the throttle actuators 40 and/or the steering actuators 44 to turn or steer the watercraft 10 while also performing the above mentioned throttle control to allow the watercraft 10 to follow and maintain some distance to the lead watercraft W. The tracking function can be adjusted by the user such that the watercraft 10 either follows in the lead watercraft path PL of the lead watercraft W as seen in FIG. 1, or follows the lead watercraft path PL of the lead watercraft W with the predetermined lateral offset amount OS with respect to the lead watercraft path PL of the lead watercraft W as seen in FIG. 2. Preferably, the predetermined lateral offset amount OS is adjustable by the user using the tablet 56, the joystick 58 and/or the user interface 60 of the watercraft 10.

Here in FIG. 13, as mentioned above, the digital controller 25 is configured to switch the control from the differential mode to the steering mode upon determining the current traveling condition of the watercraft exceeds the first traveling threshold Th1, and to switch the control from steering mode to the differential mode upon determining the current traveling condition of the watercraft falling below the second traveling threshold M2. This hysteresis logic allows for smooth transitions while operating near a desired switching point (e.g., a desired cruising speed or a desired engine speed).

In step S11, the digital controller 25 receives the current traveling state (e.g., a current cruising speed or a current engine speed) of the watercraft 10. In the first embodiment, for example, the digital controller 25 receives a cruising speed signal indicative a current cruising speed of the watercraft 10 from the running speed detector 50 or an engine speed signal indicative a current engine speed from one or more of the engine speed sensors 42. Then, the steering control process proceeds to step S12.

In step S12, the digital controller 25 determines whether the current traveling state of the watercraft 10 exceeds the first traveling threshold Th1. If the digital controller 25 determines the traveling state of the watercraft 10 exceeds the first traveling threshold Th1, then the steering control process proceeds to step S13. If the digital controller 25 determines the current traveling state of the watercraft 10 has fallen below the second traveling threshold Th2, then the steering control process proceeds to step S15.

Figure 15:
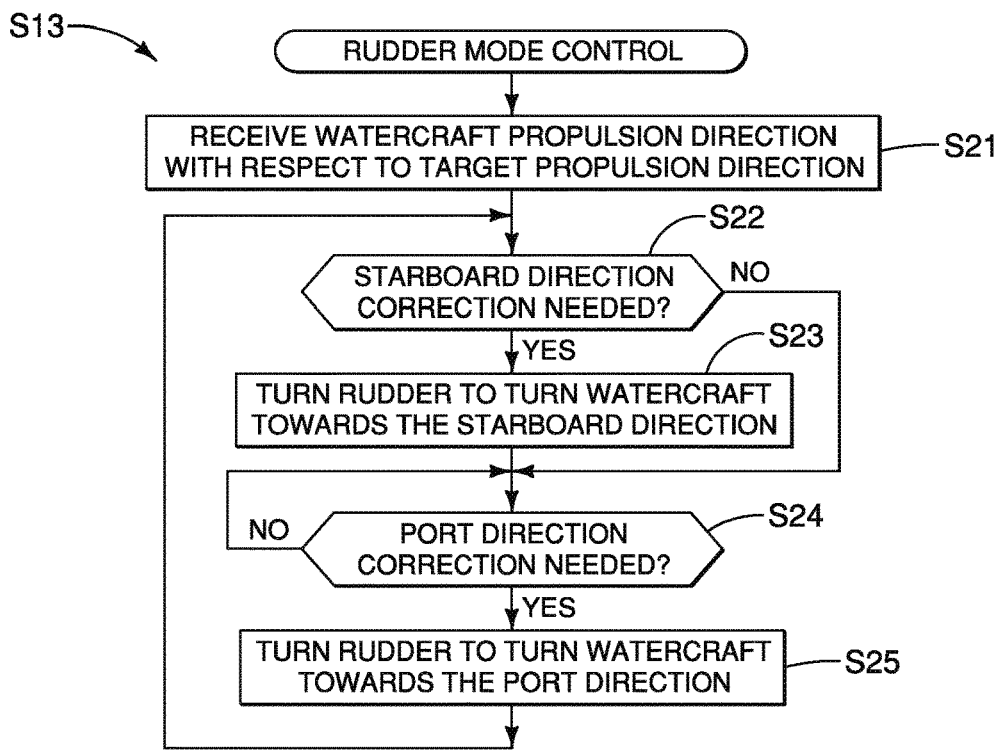
FIG. 15 is an example of a rudder mode control flow chart of the steering control executed by the watercraft control system during the auto-track & follow mode.

In step S13, the digital controller 25 executes a rudder control mode to steer the watercraft 10 and track the lead watercraft W. This type of steering is called rudder steering because at least one of the propulsion units 22 is turned as a rudder to turn the watercraft 10. In the case of rudder steering, the digital controller 25 is configured to output the at least one control command to at least one of the steering actuators 44 to turn at least one of the propulsion units 22. One example a rudder control process carried out while in the rudder control mode is illustrated in FIG. 15. Then, the steering control process proceeds to step S14.

In step S14, while in the rudder control mode, the digital controller 25 determines whether the current traveling state of the watercraft 10 has fallen below the second traveling threshold Th2. If the digital controller 25 determines the current traveling state of the watercraft 10 has fallen below the second traveling threshold Th2, then the steering control process proceeds to step S15. If the digital controller 25 determines the current traveling state of the watercraft 10 has not fallen below the second traveling threshold Th2, then the steering control process repeats step S14 to monitor when or if the steering control should be switched from rudder control to differential control.

Figure 16:
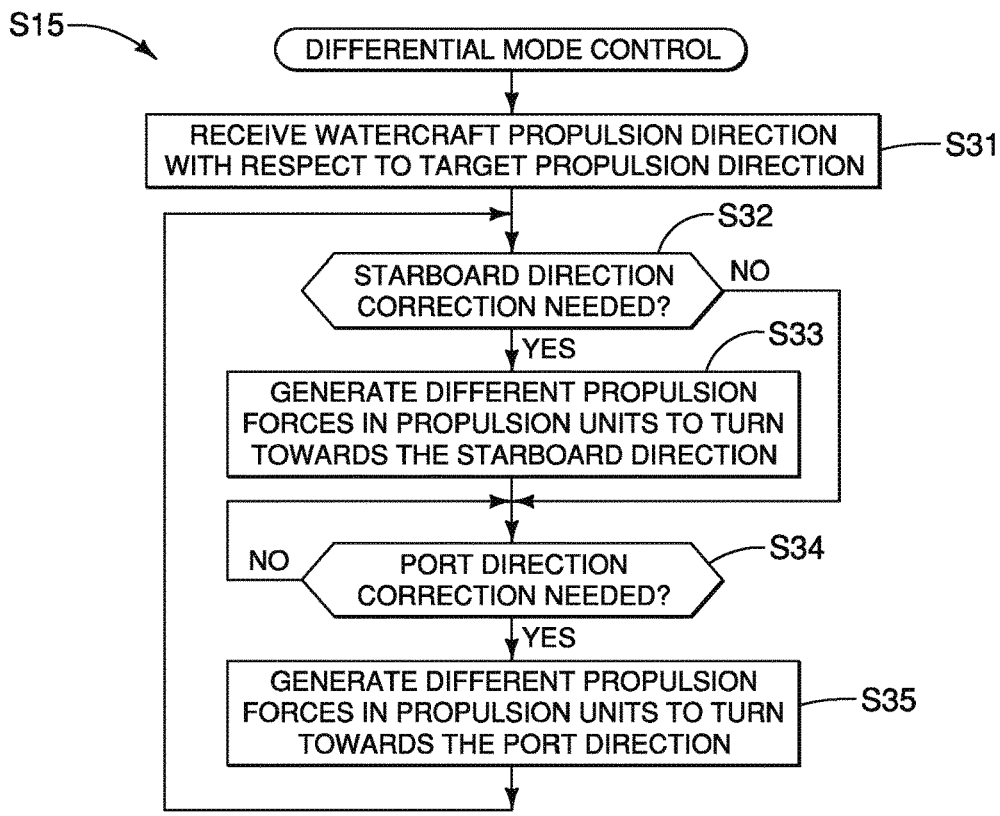
FIG. 16 is an example of a differential mode control flow chart of the steering control executed by the watercraft control system during the auto-track & follow mode.

In step S15, the digital controller 25 executes a differential control mode to steer the watercraft 10 and track the lead watercraft W. This type of steering is called differential steering because different propulsion forces are outputted between at least two of the propulsion units 22 to turn the watercraft 10. In the case of differential steering, the digital controller 25 is configured to output at least one control command to the propulsion units 22 to generate different propulsion forces between the propulsion units 22. In other words, the digital controller 25 is configured to selectively output the at least one control command to the propulsion units 22 to generate different propulsion forces (differential control) based on a predetermined traveling condition (e.g., the speed of the watercraft 10, the speed of the engines 26, etc.). One example of a differential control process carried out while in the differential control mode is illustrated in FIG. 16. Then, the steering control process proceeds back to step S12 to monitor when or if the steering control should be switched from differential control back to rudder control.

Thus, the digital controller 25 is configured to switch control from the differential mode in which the propulsion units 22 generates different propulsion forces to steer the host watercraft 10 to the steering mode in which the direction of propulsion forces changes based on the location of the leading vehicle W. While in the steering mode, the propulsion forces generated by the propulsion units 22 can be the same.

Referring now to FIG. 14, a graph illustrates a mode switching process that occurs during the steering control executed by the watercraft control system 12 during the auto-track & follow mode according to the flow chart of FIG. 13. Namely, the switching between rudder control mode and differential control mode is based on the speed of the watercraft 10 to achieve a smooth and noiseless mode switch. More specifically, a hysteresis mode switching process is used based on the speed of the watercraft 10 to achieve a smooth and noiseless mode switch. For example, the first traveling threshold Th1 can be set to 1.8 m/s and the second traveling threshold Th2 can be set to 1.2 m/s. Thus, at speeds higher than the first traveling threshold Th1 (e.g., 1.8 m/s), the watercraft 10 will operate in a rudder steering mode using the turning of the rudder for lateral control of the watercraft 10. At speeds lower than the second traveling threshold Th2 (e.g., 1.2 m/s), the watercraft 10 will operate in differential mode using differential thrust to control the lateral dynamics of the watercraft 10. This mode switching type allows for less changes, while maintaining the same performances regarding maneuverability and tracking. All parameters relating to the hysteresis mode switching process are, of course, watercraft specific and should be treated accordingly.

With the steering control process of FIGS. 13 and 14, the first traveling threshold Th1 and the second traveling threshold Th2 are preferably different values such that the watercraft 10 maintains the target following distance $Z_{des}$ without the engines 26 being adjusted too frequently. Alternatively, a steering mode switch can be provided for switching between steering by differential control and steering by rudder control.

Referring now to FIG. 15, one example of the rudder control mode of step S13 in FIG. 13 is illustrated. In the rudder control mode, the digital controller 25 controls the steering actuators 44 to turn or steer the watercraft 10 while also performing the throttle control to allows the watercraft 10 to follow and track the lead watercraft W.

In step S21, the digital controller 25 receives the images from the detector 14 which indicates the estimated current heading point x(t) (the estimated current watercraft propulsion direction of the watercraft 10) with respect to the desired heading point $x_{des}$ (the target propulsion direction of the watercraft 10). Then, the steering control process proceeds to step S22.

In step S22, based on the difference between the estimated current azimuth angle of the lead watercraft W and the desired azimuth angle of the lead watercraft W, the digital controller 25 calculates the desired/target propulsion direction that is needed to track the lead watercraft W along the desired tracking path. The estimated current azimuth angle can be determined from the estimated current heading point x(t) by the processor 25a of the digital controller 25. If the digital controller 25 determines that a starboard correction is needed, then the steering control process proceeds to step S23. If the digital controller 25 determines that a starboard correction is not needed, then the steering control process proceeds to step S24.

In step S23, the digital controller 25 outputs a signal to one or more of the steering actuators 44 to turn or steer the watercraft 10 towards the target direction computed in step S22. The angle sensors 46 detects the current steering angles of the propulsion units 22 and the digital controller 25 determines the amount that one or more of the propulsion units 22 should be turned to the target propulsion direction in order to correct the direction of the watercraft 10. Then, the steering control process proceeds to step S24.

In step S24, based on the difference between the estimated current azimuth angle of the lead watercraft W and the desired azimuth angle of the lead watercraft W, the digital controller 25 calculates the desired/target propulsion direction that is needed to track the lead watercraft W along the desired tracking path. If the digital controller 25 determines that a port correction is needed, then the steering control process proceeds to step S25. If the digital controller 25 determines that a port correction is not needed, then the steering control process repeats step S24.

In step S25, the digital controller 25 outputs a signal to one or more of the steering actuators 44 to turn or steer the watercraft 10 towards the target propulsion direction using the angle sensors 46 to detect the current steering angles of the propulsion units 22. Then, the steering control process proceeds back to step S22 to monitor when or if additional steering is needed to maintain the target propulsion direction.

Referring now to FIG. 16, one example of the differential control mode of step S15 in FIG. 13 is illustrated. In the differential control mode, the digital controller 25 controls the shift actuators 38 and/or the throttle actuators 40 to turn or steer the watercraft 10 while also performing the throttle control to allow the watercraft 10 to follow and track the lead watercraft W. By operating the shift actuators 38, the digital controller 25 can switch between a forward thrust and a rearward thrust to effectuate a change in the propulsion direction. Also, the propulsion direction can be changed by controlling the throttle actuators 40 such that the forward thrust is different in at least two of the propulsion units 22. This type of steering using the propulsion units 22 to turn the watercraft 10 is called differential steering because different propulsion forces are outputted between at least two of the propulsion units 22 to turn the watercraft 10.

In step S31, the digital controller 25 receives the images from the detector 14 which indicates the estimated current heading point x(t) (the estimated current watercraft propulsion direction of the watercraft 10) with respect to the desired heading point $x_{des}$ (the target propulsion direction of the watercraft 10). Then, the steering control process proceeds to step S32.

In step S32, based on the difference between the estimated current azimuth angle of the lead watercraft W and the desired azimuth angle of the lead watercraft W, the digital controller 25 calculates the desired/target propulsion direction that is needed to track the lead watercraft W along the desired tracking path. If the digital controller 25 determines that a starboard correction is needed, then the steering control process proceeds to step S33. If the digital controller 25 determines that a starboard correction is not needed, then the steering control process proceeds to step S34.

In step S33, the digital controller 25 outputs a signal to one or more of the shift actuators 38 and/or the throttle actuators 40 to turn or steer the watercraft 10 towards the target direction computed in step S22. The heading sensor 54 detects the current heading rate of the watercraft 10 and the digital controller 25 determines the differential amount to be generate by the propulsion units 22 in order to correct the current heading or propulsion direction of the watercraft 10 to the target propulsion direction. Then, the steering control process proceeds to step S34.

In step S34, based on the difference between the estimated current azimuth angle of the lead watercraft W and the desired azimuth angle of the lead watercraft W, the digital controller 25 calculates the desired/target propulsion direction that is needed to track the lead watercraft W along the desired tracking path. If the digital controller 25 determines that a port correction is needed, then the steering control process proceeds to step S35. If the digital controller 25 determines that a port correction is not needed, then the steering control process repeats step S34.

In step S35, the digital controller 25 outputs a signal to one or more of the shift actuators 38 and/or the throttle actuators 40 to turn or steer the watercraft 10 towards the target propulsion direction using the heading sensor 54 to detect the current propulsion direction of the watercraft 10. Then, the steering control process proceeds back to step S32 to monitor when or if additional steering is needed to maintain the target propulsion direction.

In summary, as mentioned above, the steering control can be accomplished by rudder control and/or differential control. In the case of rudder control, the digital controller 25 is configured to output the at least one control command to one of the steering units 50 to change the propulsion direction of the watercraft 10. In the case of differential control, the digital controller 25 is configured to output the at least one control command to the propulsion units 22 to generate different propulsion forces between the propulsion units 22.

Thus, in summary, the digital controller 25 is configured to output at least one control command related to a propulsion direction of the watercraft 10 and a propulsion force of the watercraft 10 to at least one of the propulsion units 22 to track and follow the lead watercraft W in accordance with the on-board longitudinal control system and the on-board lateral control system. Thus, the digital controller 25 controls the throttle actuators 40 of the engines 26 of the propulsion units 22 to maintain the target following distance $Z_{des}$ behind the lead watercraft W while also performing either rudder control or differential control to steer to the watercraft 10 such that the watercraft 10 follows and tracks the lead watercraft W.

Figure 17:
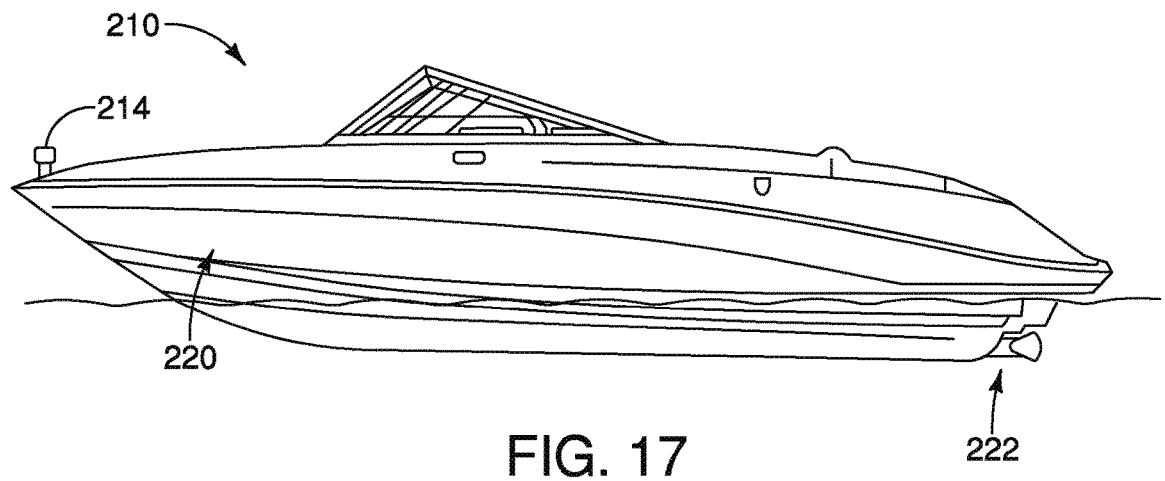
FIG. 17 is a side elevational view of a host watercraft equipped with the watercraft control system in which the host watercraft is a jet boat that uses jet propulsion.
Figure 18:
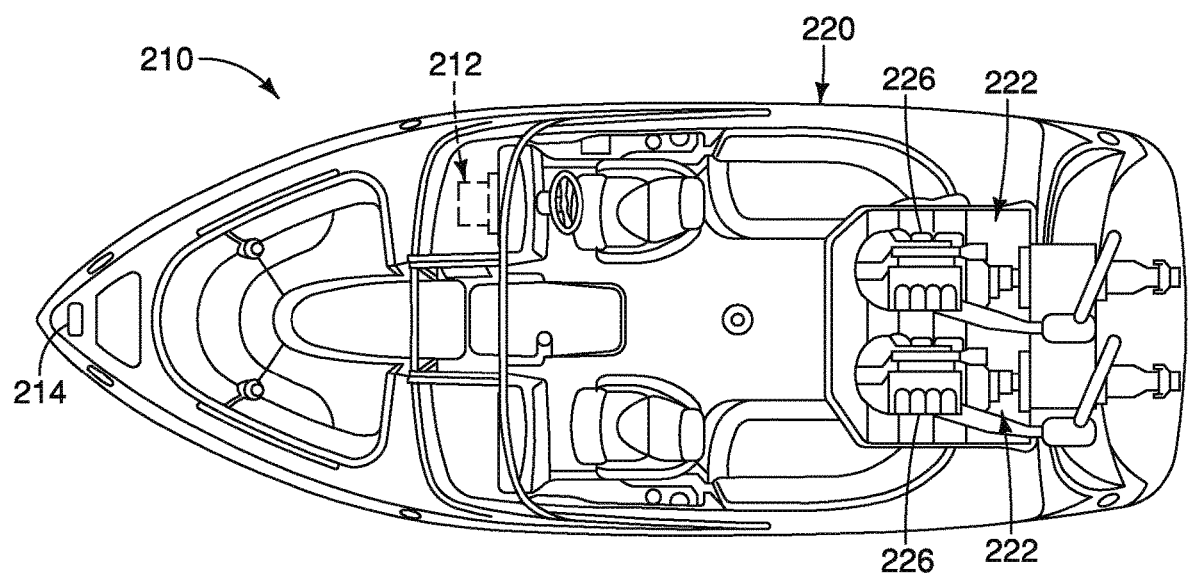
FIG. 18 is a top view of a host watercraft illustrated in FIG. 17 with a portion of the watercraft broken away to reveal a pair of jet propulsion units.
Figure 19:
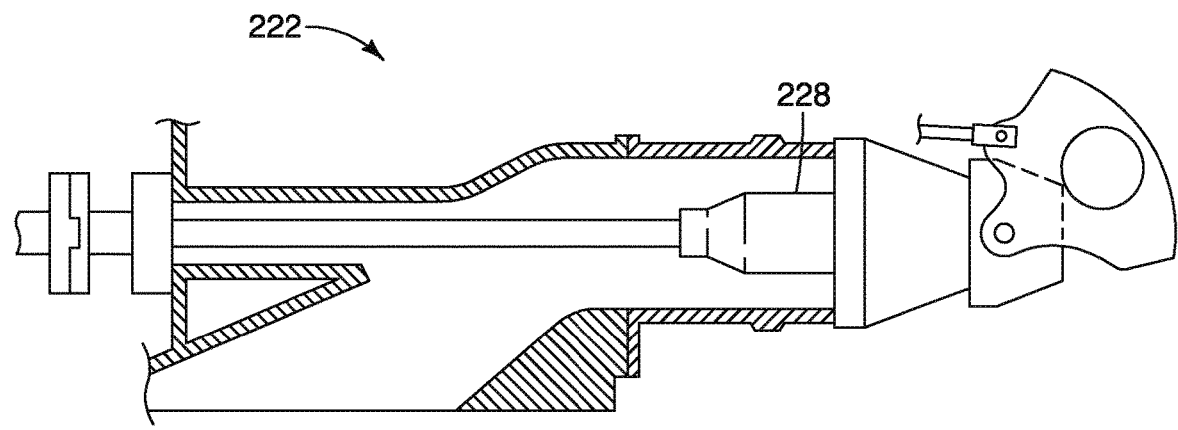
FIG. 19 is a simplified cross sectional view of one of the jet propulsion units of the host watercraft illustrated in FIGS. 17 and 18.

Referring now to FIGS. 17 to 19, a watercraft 210 is illustrated in the form of a jet propulsion boat that is equipped with a watercraft control system 212. The watercraft control system 212 is the same as the watercraft control system 12, discussed above, except that the watercraft control system 212 is adapted to a jet propulsion boat. Basically, the watercraft 210 includes a watercraft body 220 and a pair of propulsion units 222. The watercraft body 220 is provided with the propulsion units 222 in a conventional manner. The propulsion units 222 are steerable in a conventional manner. Each of the propulsion units 222 includes an engine 226 as seen in FIG. 18. Each of the engines 226 drives an impeller 228 as seen in FIG. 19 in a conventional manner. Since jet propulsion boats are well known, the watercraft 210 will not be discussed in more detail.

The watercraft control system 212 is configured to execute the auto-track & follow mode in the same way as the watercraft control system 12. Thus, the watercraft 210 is provided a detector 214 for tracking and following a lead watercraft. Like, the first embodiment, the detector 214 is a stereo camera that is used to detect a lead watercraft and determine a distance of the watercraft 210 from the lead watercraft. In this way, the watercraft control system 212 can execute the auto-track & follow mode in the same way as the watercraft control system 12 such that the watercraft 210 can track and follow a lead watercraft.

Figure 20:
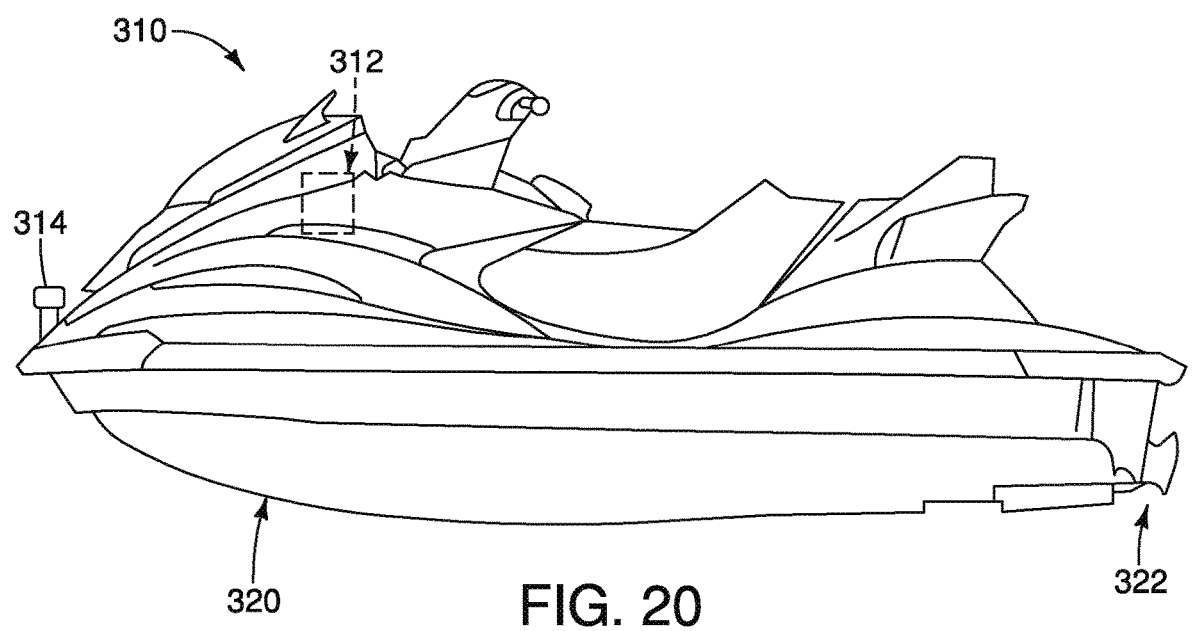
FIG. 20 is a side elevational view of a host watercraft equipped with the watercraft control system in which the host watercraft is a personal watercraft that uses jet propulsion.

Referring now to FIG. 20, a watercraft 310 is illustrated in the form of a personal watercraft that is equipped with a watercraft control system 312. The watercraft 310 is a saddle seat type of personal watercraft that is well known. The watercraft control system 312 is the same as the watercraft control system 12, discussed above, except that the watercraft control system 312 is adapted to a personal watercraft. Basically, the watercraft 310 includes a watercraft body 320 and a single propulsion unit 322. The watercraft body 320 is provided with the propulsion unit 322 in a conventional manner. The propulsion unit 322 is a jet propulsion device similar to the one illustrated in FIG. 19. The watercraft control system 312 of the watercraft 310 is configured to carry out the auto-track & follow mode in the same manner as discussed above, except that the watercraft control system 12 does not utilize the differential mode control. In other words, since the watercraft 310 only has a single propulsion unit 322, the steering control is solely carry out using rudder control during the auto-track & follow mode. Since personal watercrafts are well known, the watercraft 310 will not be discussed in more detail.

Other than omitting differential steering control, the watercraft control system 312 is configured to execute the auto-track & follow mode in the same way as the watercraft control system 12. Thus, the watercraft 310 is provided a detector 314 for tracking and following a lead watercraft. Like, the first embodiment, the detector 314 is a stereo camera that is used to detect a lead watercraft and determine a distance of the watercraft 310 from the lead watercraft. In this way, the watercraft control system 312 can execute the auto-track & follow mode in substantially the same way as the watercraft control system 12 such that the watercraft 310 can track and follow a lead watercraft.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Thus, as used herein, the singular forms "a," "an" and "the" are intended to include the plural forms as well, unless the context clearly indicates otherwise. Also, the terms "part," "section," "portion." "member" or "element" when used in the singular can have the dual meaning of a single part or a plurality of parts. Unless otherwise defined, all terms (including technical and scientific terms) used herein have the same meaning as commonly understood by one of ordinary skill in the art to which illustrative embodiments of the inventive concepts belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

It will be understood that when an element is referred to as being "connected" or "coupled" to another element, it can be directly connected or coupled to the other element or intervening elements may be present. In contrast, when an element is referred to as being "directly connected" or "directly coupled"" to another element, there are no intervening elements present. As used herein the term "and/or" includes any and all combinations of one or more of the associated listed items. Additionally, similar words used to describe the relationship between elements or layers should be interpreted in a like fashion (e.g., "between" versus "directly between", "above" versus "directly above", "below" versus "directly below", "adjacent" versus "directly adjacent," "on" versus "directly on"). Thus, components that are shown directly connected or contacting each other can have intermediate structures disposed between them unless specified otherwise.

It will be understood that, although the terms "first", "second", etc. may be used herein to describe various elements, components, regions, layers, positions and/or sections, these elements, components, regions, layers, positions and/or sections should not be limited by these terms. These terms are only used to distinguish one element, component, region, layer, position or section from another element, component, region, layer, position or section. Thus, a first element, component, region, layer, position or section discussed above could be termed a second element, component, region, layer, position or section without departing from the teachings of illustrative embodiments.

Spatially relative terms, such as "forward", "rearward", "above", "below", "beneath", "downward", "vertical", "horizontal", and "transverse" as well as any other similar spatial terms may be used herein for the ease of description to describe one element or feature's relationship to another element(s) or feature(s) of the above embodiments. These terms, as utilized to describe the present invention should be interpreted relative to a watercraft floating in calm water.

The terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A watercraft configured to track and follow a lead watercraft cruising ahead of the watercraft, the watercraft comprising:
a watercraft body;
a propulsion unit provided to the watercraft body;
a detector configured to detect the lead watercraft in front of the watercraft;
a digital controller configured to communicate with the detector to receive a detection signal from the detector, the digital controller being configured to output at least one control command related to a propulsion direction of the watercraft and a propulsion force of the watercraft to at least the propulsion unit to track and follow a path of the lead watercraft with a predetermined lateral offset distance with respect to the path of the lead watercraft; and
a user interface that communicates with the digital controller and includes a user input to select the lead watercraft in a displayed image of an image obtained by the detector,
the digital controller being configured to output the at least one control command to at least the propulsion unit such that a location of the lead watercraft in the displayed image is maintained at a location that is set in the displayed image according to the predetermined lateral offset distance.

2. The watercraft according to claim 1, wherein the detector includes an image recognition device.

3. The watercraft according to claim 1, further comprising an additional propulsion unit provided to the watercraft body.

4. The watercraft according to claim 3, wherein the digital controller is configured to output the at least one control command to the propulsion units to generate different propulsion forces between the propulsion units.

5. The watercraft according to claim 3, wherein the digital controller is configured to switch control from a differential mode in which the propulsion units generate different propulsion forces to a steering mode in which the propulsion units generate propulsion forces in the same direction based on a predetermined traveling condition.

6. The watercraft according to claim 1, further comprising a steering unit provided to the watercraft body,
the digital controller being configured to output the at least one control command to the steering unit to change the propulsion direction.

7. The watercraft according to claim 6, further comprising an additional propulsion unit provided to the watercraft body,
the digital controller being configured to selectively output the at least one control command to the propulsion units to generate different propulsion forces between the propulsion units based on a predetermined traveling condition.

8. A watercraft configured to track and follow a lead watercraft cruising ahead of the watercraft, the watercraft comprising:
a watercraft body;
a plurality of propulsion units provided to the watercraft body;
a detector configured to detect the lead watercraft in front of the watercraft; and
a digital controller configured to communicate with the detector to receive a detection signal from the detector, the digital controller being configured to output at least one control command related to a propulsion direction of the watercraft and a propulsion force of the watercraft to at least the propulsion units to track and follow the lead watercraft,
the digital controller being configured to switch control from a differential mode in which the propulsion units generate different propulsion forces to a steering mode in which the propulsion units generate propulsion forces in the same direction based on a predetermined traveling condition,
the predetermined traveling condition including a first traveling threshold and a second traveling threshold that is smaller than the first traveling threshold, and
the digital controller being configured
to switch the control from the differential mode to the steering mode upon determining the watercraft exceeding the first traveling threshold,
to maintain the steering mode while determining the watercraft exceeding the second traveling threshold after determining the watercraft falling below the first traveling threshold in the steering mode,
to switch the control from the steering mode to the differential mode upon determining the watercraft falling below the second traveling threshold, and
to maintain the differential mode while determining the watercraft falling below the first traveling threshold after determining the watercraft exceeding the second traveling threshold in the differential mode.

9. A watercraft control system configured to track and follow a lead watercraft cruising ahead of a host watercraft, the watercraft control system comprising:
a detector configured to detect the lead watercraft in front of the host watercraft; and
a digital controller configured to communicate with the detector to receive a detection signal from the detector, the digital controller being configured to output at least one control command related to a propulsion direction of the host watercraft and a propulsion force of the host watercraft to at least a propulsion unit of the host watercraft to track and follow a path of the lead watercraft with a predetermined lateral offset distance with respect to the path of the lead watercraft,
the digital controller being configured to track and follow the lead watercraft based on a selection of the lead watercraft in a displayed image of an image obtained by the detector in response to an input from a user input relative to the displayed image, and
the digital controller being configured to output the at least one control command to at least the propulsion unit such that a location of the lead watercraft in the displayed image is maintained at a location that is set in the displayed image according to the predetermined lateral offset distance.

10. The watercraft control system according to claim 9, wherein
the detector includes an image recognition device.

11. The watercraft control system according to claim 9, wherein
the detector is configured to communicate with an onboard computer system of the host watercraft, and the digital controller includes a communication interface to communicate with the onboard computer system of the host watercraft.

12. The watercraft control system according to claim 9, wherein
the digital controller is configured to output the at least one control command to generate different propulsion forces based on the detection signal from the detector.

13. The watercraft control system according to claim 9, wherein
the digital controller is configured to output the at least one control command to a steering unit of the host watercraft to change the propulsion direction.

14. The watercraft control system according to claim 13, wherein
the digital controller being configured to selectively output the at least one control command to generate different propulsion forces based on a predetermined traveling condition.

15. The watercraft control system according to claim 9, wherein
the digital controller is configured to switch control from a differential mode in which different propulsion forces are generated to a steering mode in which propulsion forces in the same direction are generated based on a predetermined traveling condition.

16. A watercraft control system configured to track and follow a lead watercraft cruising ahead of a host watercraft, the watercraft control system comprising:
a detector configured to detect the lead watercraft in front of the host watercraft; and
a digital controller configured to communicate with the detector to receive a detection signal from the detector, the digital controller being configured to output at least one control command related to a propulsion direction of the host watercraft and a propulsion force of the host watercraft to at least a propulsion unit of the host watercraft to track and follow the lead watercraft,
the digital controller being configured to switch control from a differential mode in which different propulsion forces are generated to a steering mode in which propulsion forces in the same direction are generated based on a predetermined traveling condition,
the predetermined traveling condition including a first traveling threshold and a second traveling threshold that is smaller than the first traveling threshold, and
the digital controller being configured
to switch the control from the differential mode to the steering mode upon determining the host watercraft exceeding the first traveling threshold,
to maintain the steering mode while determining the host watercraft exceeding the second traveling threshold after determining the host watercraft falling below the first traveling threshold in the steering mode,
to switch the control from the steering mode to the differential mode upon determining the host watercraft falling below the second traveling threshold, and
to maintain the differential mode while determining the host watercraft falling below the first traveling threshold after determining the host watercraft exceeding the second traveling threshold in the differential mode.

\* \* \* \* \*